US011323592B2

(12) United States Patent
Matsuoka

(10) Patent No.: US 11,323,592 B2
(45) Date of Patent: May 3, 2022

(54) IMAGE PROCESSING REDUCING PROCESSING TIME OF TONE CORRECTION CALIBRATION WITH FLUORESCENT OR SPECIAL COLORS BY SELECTION OF COLOR COMBINATIONS

(71) Applicant: Taira Matsuoka, Kanagawa (JP)

(72) Inventor: Taira Matsuoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/924,379

(22) Filed: Jul. 9, 2020

(65) Prior Publication Data

US 2021/0014384 A1    Jan. 14, 2021

(30) Foreign Application Priority Data

Jul. 11, 2019 (JP) .............................. JP2019-129581
Jun. 5, 2020  (JP) .............................. JP2020-098900

(51) Int. Cl.
*H04N 1/60* (2006.01)
(52) U.S. Cl.
CPC ......... *H04N 1/6027* (2013.01); *H04N 1/6008* (2013.01); *H04N 1/6055* (2013.01)

(58) Field of Classification Search
CPC .. H04N 1/6027; H04N 1/6055; H04N 1/6008; H04N 1/54; H04N 1/6033
See application file for complete search history.

(56) References Cited

U.S. PATENT DOCUMENTS

| 9,665,027 B2 | 5/2017 | Matsuoka | |
| 2017/0227904 A1* | 8/2017 | Matsuoka | ................ H04N 1/54 |
| 2017/0247560 A1* | 8/2017 | Watanabe | ................ B41J 2/21 |

FOREIGN PATENT DOCUMENTS

JP            6273934           2/2018

* cited by examiner

*Primary Examiner* — Christopher Wait
(74) *Attorney, Agent, or Firm* — IPUSA, PLLC

(57) ABSTRACT

An image processing apparatus includes circuitry configured to receive a designation of a to-be-corrected color that is a process color or a special color different from the process color and is to be corrected; identify, on the basis of the designation, a tone correction pattern, and generate rendering data of the tone correction pattern to be used for forming an image on a recording medium; obtain a standard value of the to-be-corrected color; and correct the to-be-corrected color on the basis of a difference between a color measuring result obtained from measuring a color of the image, of the tone correction pattern formed on the recording medium and the standard value.

6 Claims, 30 Drawing Sheets

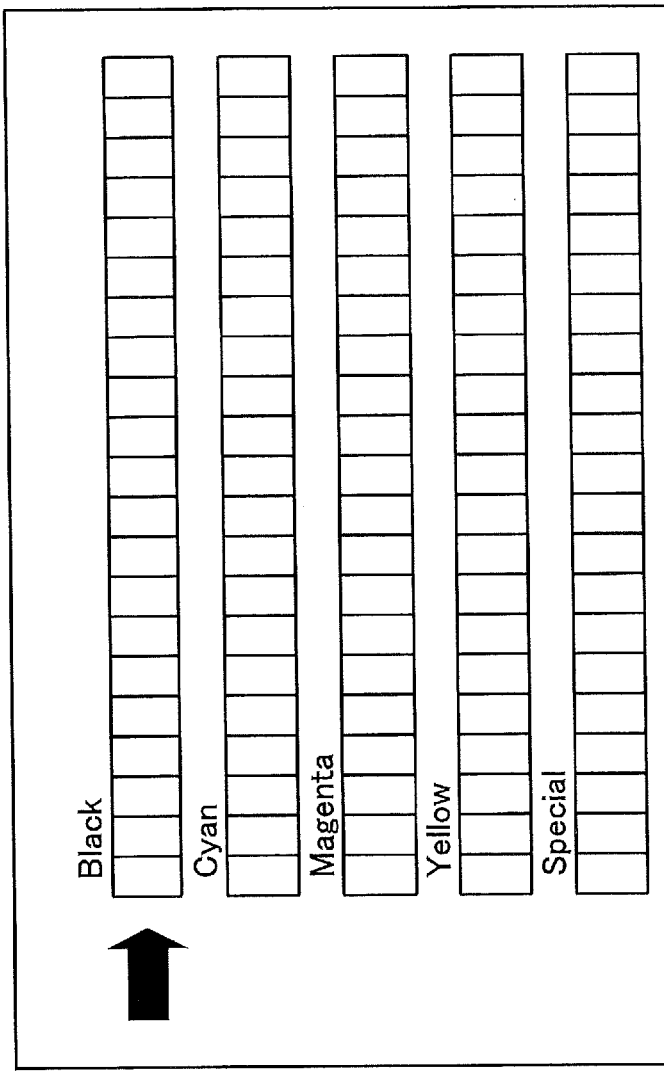

IMAGE PROCESSING REDUCING PROCESSING TIME OF TONE CORRECTION CALIBRATION WITH FLUORESCENT OR SPECIAL COLORS BY SELECTION OF COLOR COMBINATIONS

BACKGROUND OF THE INVENTION

1. Field of the Invention

The present invention relates to an image processing apparatus, an image processing system, and a non-transitory recording medium.

2. Description of the Related Art

In the related art, a method for correcting tones of colors used for forming an image is known.

For example, in image forming using CMYK and white toners, first, in a calibration mode, an image forming apparatus forms images for calibration on a recording medium on the basis of previously stored patch data. Thus, the image forming apparatus produces a calibration sheet that is a recording medium having images for calibration formed on the basis of the patch data. Then, by optically reading the calibration sheet with a scanner or the like, the densities at areas formed in the calibration sheet are obtained. A method for thus performing tone correction is known (see, for example, Japanese Patent No. 6273934).

SUMMARY OF THE INVENTION

An image processing apparatus according to an embodiment of the present invention includes circuitry configured to receive a designation of a to-be-corrected color that is a process color or a special color different from the process color and is to be corrected; identify, on the basis of the designation, a tone correction pattern, and generate rendering data of the tone correction pattern to be used for forming an image on a recording medium; obtain a standard value of the to-be-corrected color; and correct the to-be-corrected color on the basis of a difference between a color measuring result obtained from measuring a color of the image of the tone correction pattern formed on the recording medium and the standard value.

Other objects, features and advantages of the present invention will become more apparent from the following detailed description when read in conjunction with the accompanying drawings.

BRIEF DESCRIPTION OF DRAWINGS

FIG. 9 depicts an example of a screen page displayed by the display unit when black (K) is designated as a to-be-corrected color;

FIG. 19 depicts an example of tone correction patterns according to a third embodiment;

FIG. 22 depicts an example of tone correction patterns according to the fourth embodiment;

FIG. 28 depicts an example of tone correction patterns for a case of using a white layer;

DESCRIPTION OF THE EMBODIMENTS

In the above-described method of the related art, it may be desirable to designate a to-be-corrected color. For example, in the above-described method, because tone correction is performed even on colors for which correction is not necessary, processing time for performing correction may be long. In some cases, it is desirable to reduce the processing time of tone correction by appropriately reducing colors to be actually corrected.

It is an object of embodiments of the present invention to reduce the processing time of tone correction.

The embodiments of the present invention can reduce the processing time of tone correction.

Hereinafter, the embodiments of the invention will be described with reference to the drawings.

First Embodiment

<Example of Overall Configuration>

Figure 1:
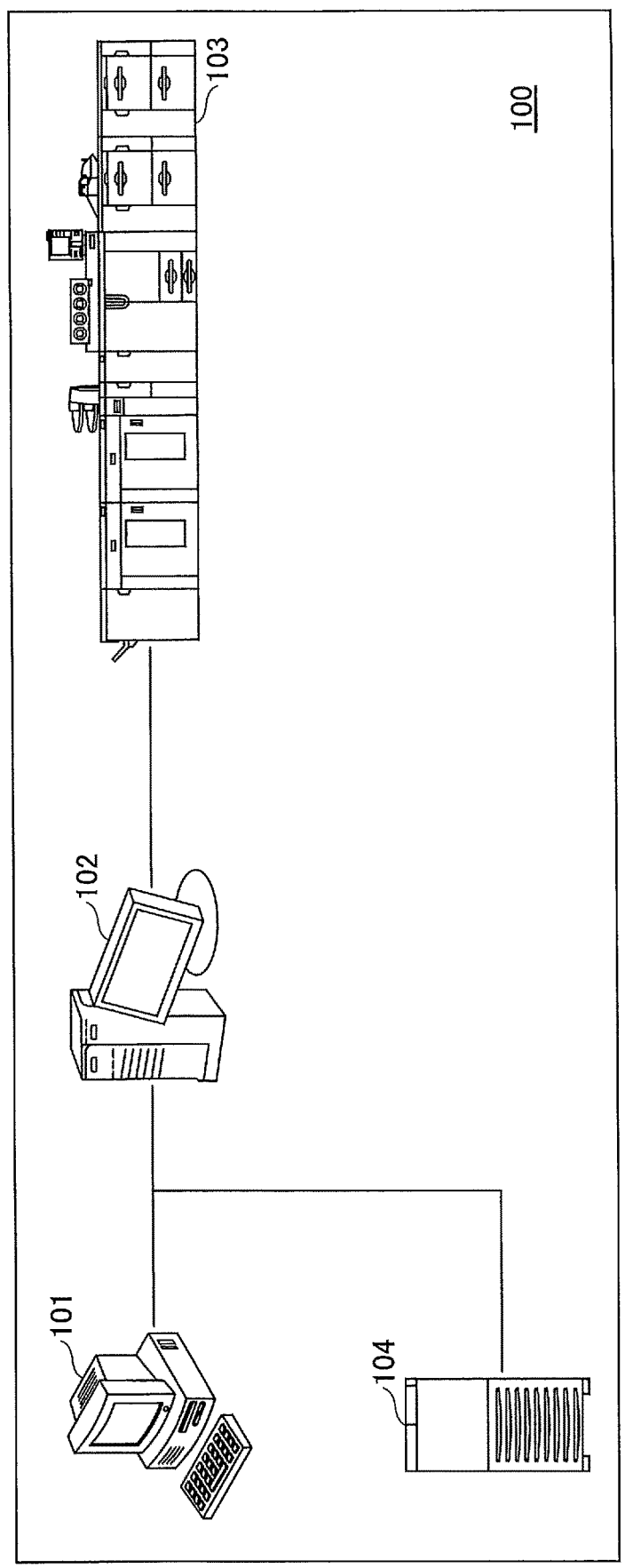
FIG. 1 depicts an overall configuration example of an image processing system.

FIG. 1 is a diagram depicting an overall configuration example of an image processing system. For example, the image processing system 100 has an overall configuration including a client personal computer (PC) (hereinafter, referred to as a "client PC 101") that is an information processing apparatus, a DFE that is an image processing apparatus (hereinafter, referred to as a "DFE 102"), an image forming apparatus 103 that is an example of an image forming apparatus, and a management server 104 that is an information management apparatus.

At the client PC 101, a user creates a print job and transmits the print job to the DFE 102 or the management server 104. For example, the client PC 101 has a hardware configuration that includes a display, such as a liquid crystal display, and input devices, such as a mouse and a keyboard. Details of the hardware configuration will be described later.

The DFE 102 receives a print job from the client PC 101, the management server 104, or the like. The DFE 102 generates rendering data on the basis of the received print job using a raster image processor engine (RIP engine) and transmits the rendering data to the image forming apparatus 103. Details of the hardware configuration will be described later.

The image forming apparatus 103 forms an image on the basis of rendering data received from the DFE 102. Details of the hardware configuration will be described later.

The management server 104 stores and manages print jobs received from the client PC 101 in a storage unit. The management server 104 transmits a print job to the DFE 102 or the like upon request of the DFE 102 or the like. Details of the hardware configuration will be described later.

The overall configuration is not limited to the configuration described above. For example, an information processing apparatus or an information management apparatus may be further provided, or such an apparatus may be omitted, or may be integrated with other information processing apparatus.

The DFE 102 communicates with the image forming apparatus 103 and controls an image forming process or the like in the image forming apparatus 103. The client PC 101 is connected to the DFE 102. The connection may be via a network.

In the client PC 101, image data written in a language such as PDL is generated by a pre-installed application. The client PC 101 transmits the generated image data to the DFE 102.

The DFE 102 then converts the image data described in a language such as PDL into rendering data in such a format that the image forming apparatus 103 can print an image according to the rendering data. Subsequently, the DFE 102 transmits the image data to the image forming apparatus 103.

The image forming apparatus 103 has a plurality of color materials and forms an image on the basis of rendering data received from the DFE 102. In the present embodiment, a case in which the image forming apparatus 103 is an image forming apparatus of an electrophotographic type and the color materials are toners is described. However, the present invention is not limited to the embodiment. The image forming apparatus 103 may be an ink jet type image forming apparatus, and the color materials may be inks.

The image processing system 100 may include the management server 104 or the like. The image processing system 100 may manage print data received from the client PC 101 by the management server 104 or the like. The management server 104 may transmit the print data to the DFE 102 upon request from the DFE 102.

The client PC 101, the image forming apparatus 103, or the management server 104 may include some or all of the functions of the DFE 102.

<Example Hardware Configuration>

Figure 2:
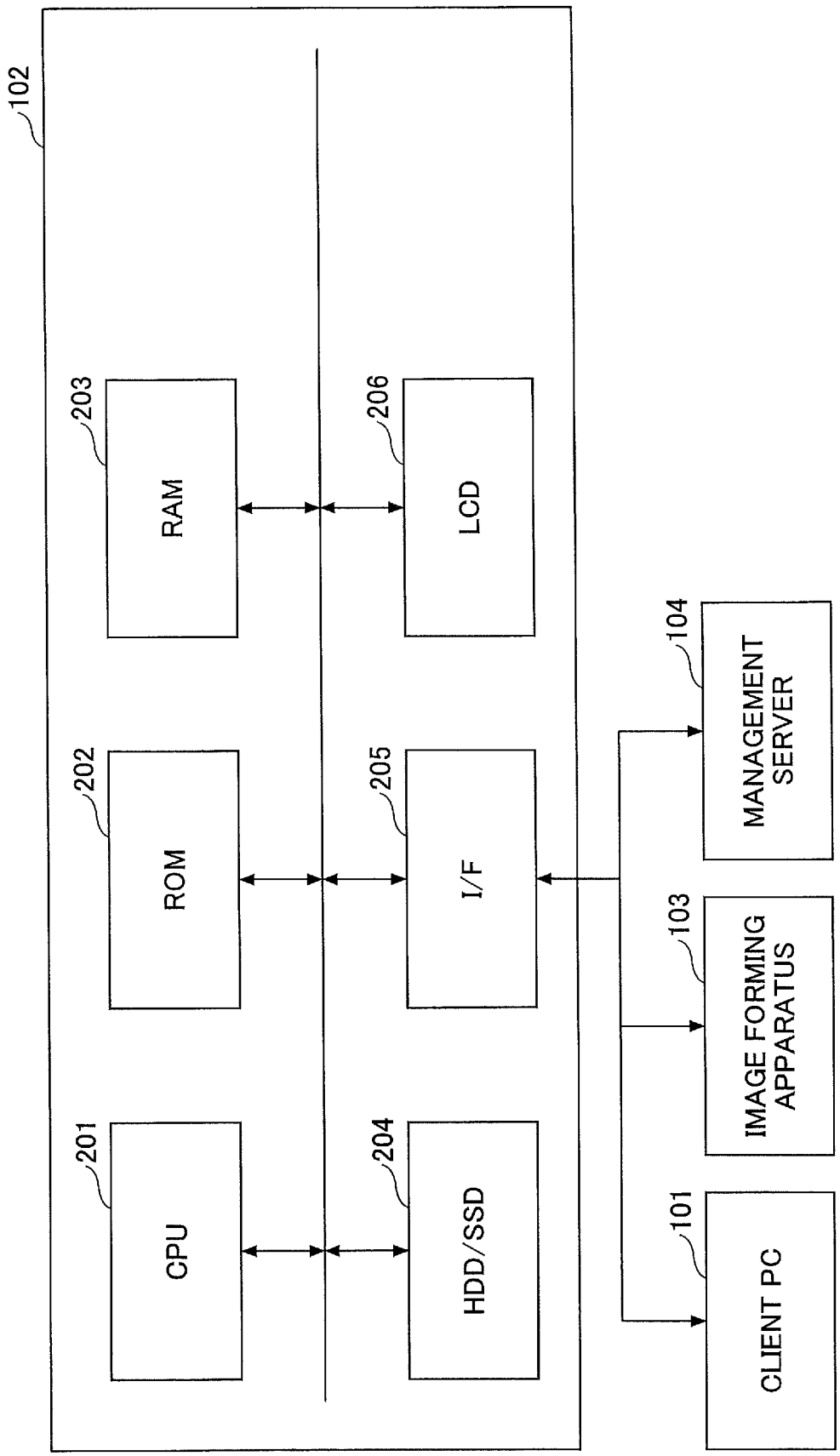
FIG. 2 depicts an example of a hardware configuration of an image processing apparatus.

FIG. 2 depicts an example of a hardware configuration of the image processing apparatus (the DFE 102). The client PC 101, the DFE 102, and the management server 104 may have the same hardware configurations. Hereinafter, an example of the DFE 102 will be described, and description of the other apparatuses will be omitted. However, the client PC 101, which is an example of an information processing apparatus, may be a PC, a server, a smartphone, or the like, or may have a different hardware configuration.

As depicted in the FIG. 2, the DFE 102 has a hardware configuration including a CPU (CPU 201), a ROM (a Read-Only Memory, hereinafter referred to as "ROM 202"), a RAM (Random Access Memory, hereinafter referred to as "RAM 203"), a HDD (Hard Disk Drive)/SSD (Solid State Drive) (hereinafter referred to as "HDD/SSD 204"), an I/F (hereinafter referred to as "I/F 205"), and a LCD (Liquid Crystal Display, hereinafter referred to as "LCD 206").

The CPU 201 uses the RAM 203 as a working area and executes a program stored in the ROM 202.

The HDD/SSD 204 is used as a storage unit and stores predetermined setting values. Information stored in the HDD/SSD 204 may be used by the CPU 201 when a program is executed.

The I/F 205 is an interface that enables communication between the DFE 102 and the client PC 101, the image forming apparatus 103, and the management server 104.

The LCD 206 is an output device that displays processing results.

The depicted hardware configuration is an example, and the image processing apparatus 102 may have a hardware configuration in which further a CPU, a HDD/SDD, an input device such as a keyboard or a mouse are provided.

Figure 3:
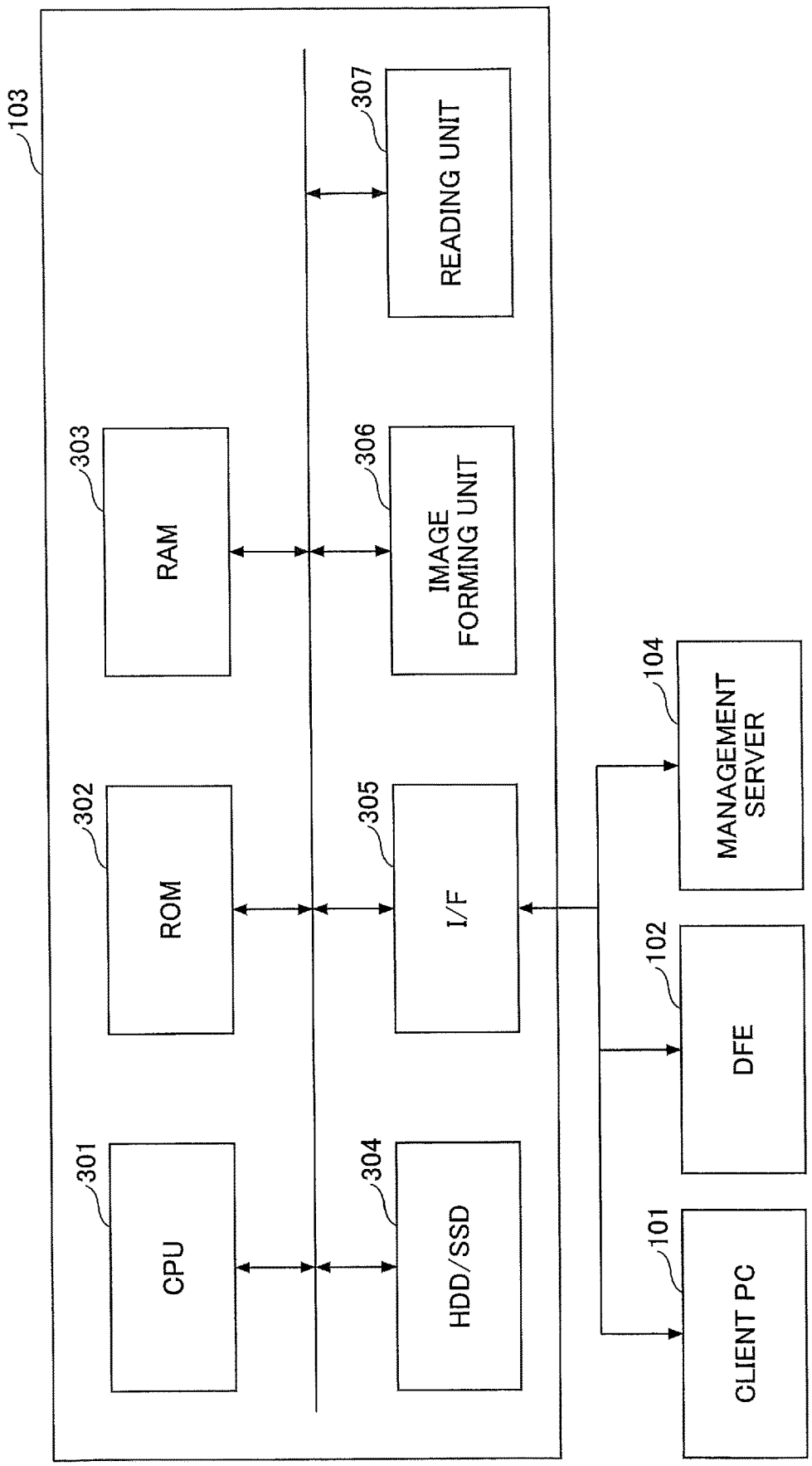
FIG. 3 depicts a hardware configuration example of an image forming apparatus.

FIG. 3 is a diagram illustrating an example of the hardware configuration of the image forming apparatus 103. As depicted in FIG. 1, the image forming apparatus 103 has a hardware configuration that includes a CPU 301, a ROM 302, a RAM 303, a HDD/SSD 304, a I/F 305, an image forming unit 306, and a reading unit 307.

The image forming unit 306 and the reading unit 307 have the following hardware configurations, for example.

Figure 4:
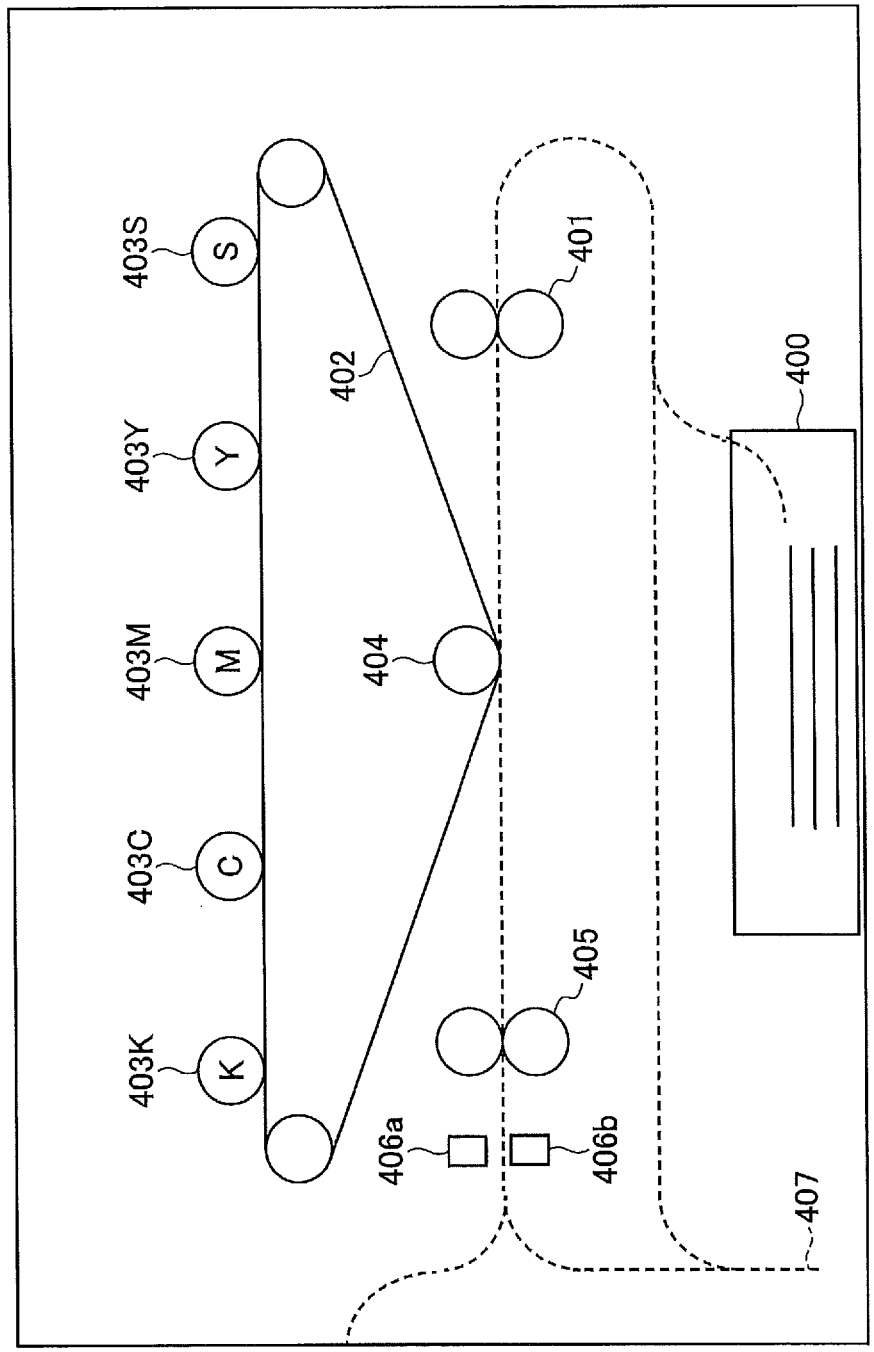
FIG. 4 depicts an example of a hardware configuration of an image forming unit and a reading unit.

FIG. 4 is a diagram illustrating an example of a hardware configuration of the image forming unit and the reading unit. For example, the image forming unit 306 includes an intermediate transfer belt, a plurality of photoconductor drums, a paper-feeding tray, a conveying roller, a transfer roller, a fixing roller, and so forth.

In the image forming unit 306, along the intermediate transfer belt 402 that is an endless moving member, photoconductor drums of respective colors 403S, 403Y, 403M, 403C, and 403K (hereinafter collectively referred to as "photoconductor drums 403") are arranged. Thus, the depicted example is of a so-called "tandem type".

The photoconductor drum 403Y forms a yellow image (Y color), the photoconductor drum 403M forms a magenta image (M color), the photoconductor drum 403C forms a cyan image (C color), the photoconductor drum 403K forms a black image (K color), and the photoconductor drum 403S forms a special color image (metallic color, a fluorescent color such as fluorescent yellow or fluorescent pink, or a special color such as white) that is different from CMYK colors, which are process colors. Although CMYK colors are process colors in the embodiment, CMY colors may be process colors; and, instead of CMY colors, red (R color), green (G color), and blue (B color) may be process colors.

First, a recording medium, such as paper, is fed from a paper-feeding tray 400 and conveyed by a conveying roller 401. For transfer of images, the photoconductor drums are arranged in the order of, for example, 403S, 403Y, 403M, 403C, and 403K, from the upstream side to the upstream side in the conveying direction along the intermediate transfer belt 402 on which an intermediate transfer image is formed. In this regard, the order of the photoconductor drums 403 is not limited to this order, and may be reversed from the upstream, i.e., 403K, 403C, 403M, 403Y, 403S, or the like. In addition, the position of the photoconductor drum 403S for the special color is not limited to the most downstream or upstream position, and may be another position.

On the surface of each photoconductor drum 403, an image of the corresponding color developed with the corresponding toner is formed. The image of each color is transferred to the intermediate transfer belt 402 and thus superimposed with an image of another color. Thus, a full color image is formed on the intermediate transfer belt 402. The full color image formed on the intermediate transfer belt 402 is transferred onto paper by the function of the transfer roller 404 in the conveying path (depicted in FIG. 4 as a dashed line) of the paper (the recording medium). The paper on which the image is formed is then further conveyed and the image is fixed (i.e., the image is formed) by the fixing roller 405.

When images are to be formed on both sides of paper, the paper is conveyed to a reverse path 407 after an image is formed on one side of the paper, and the front and the rear sides are reversed. Then, the paper is again conveyed to the position of the transfer roller 404, and an image is formed on the back side of the paper.

The reading unit 307 includes, for example, a front-side in-line sensor 406*a* and a back-side in-line sensor 406*b* (hereinafter collectively referred to as "in-line sensors 406").

The in-line sensors 406 read both sides of paper and generates read image data representing the images fixed on the paper.

The in-line sensors 406 may include only one of front-side in-line sensor 406*a* and the back-side in-line sensor 406*b*. In such a case, for example, the in-line sensor may include one in-line sensor 406*a* and may read an image when the image is formed on a front side of paper. Thereafter, after an image is formed on the back side of the paper, the back-side image may be read by the same in-line sensor 406*a*.

<Example of Functional Configuration>

Figure 5:
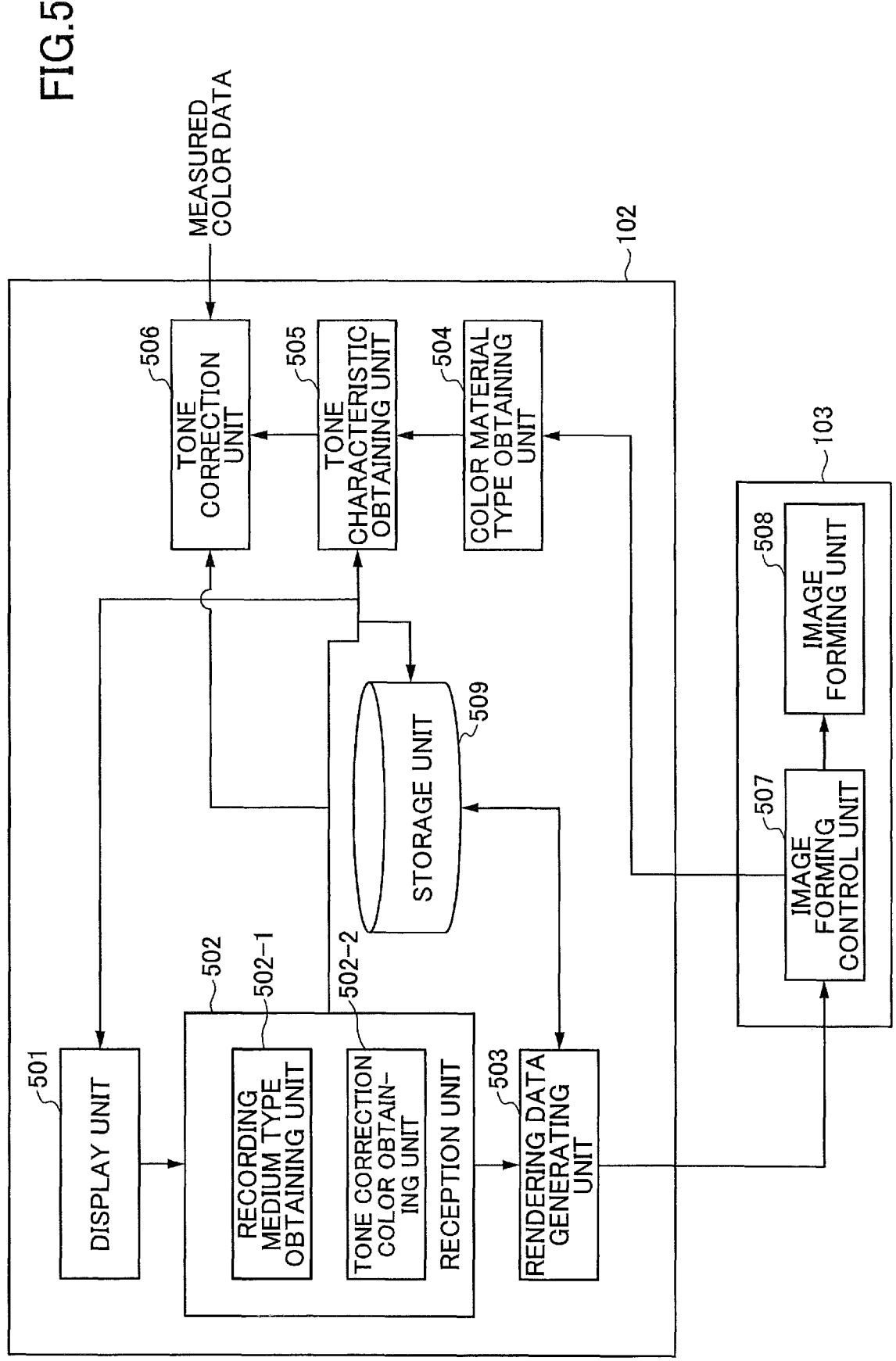
FIG. 5 depicts a functional configuration of digital front end (DFE) and the image forming apparatus according to a first embodiment.

FIG. 5 depicts a functional configuration example of the DFE 102 and the image forming apparatus 103 according to the first embodiment.

The DFE 102 has a functional configuration including a display unit 501, a reception unit 502, a rendering data generating unit 503, a color material type obtaining unit 504, a tone characteristic obtaining unit 505, and a tone correction unit 506. The functional configuration is not limited to the configuration depicted in FIG. 5, and may further include function units depending on an embodiment or the like. Each functional unit is implemented as a result of the CPU 201 executing a program stored in the ROM 202.

The display unit 501 displays a screen page (a color designation screen page) with which a to-be-corrected color to be processed with respect to tone correction can be selected from the LCD 206 or the like.

The reception unit 502 includes a recording medium type obtaining unit 502-1 and a tone correction color obtaining unit 502-2, and receives a designation of a to-be-corrected color by the user through an input device such as a keyboard or a mouse. The reception unit 502 outputs information concerning the received to-be-corrected color (to-be-corrected information) to the rendering data generating unit 503 and the tone characteristic obtaining unit 505, which will be described later. In this regard, a single or a plurality of to-be-corrected colors may be designated.

The rendering data generating unit 503 obtains tone correction pattern data stored in the storage unit 509 on the basis of the to-be-corrected color information received from the reception unit 502, generates rendering data on the basis of the obtained tone correction pattern data, and outputs the rendering data to the image forming control unit 507, which will be described later.

Figure 6:
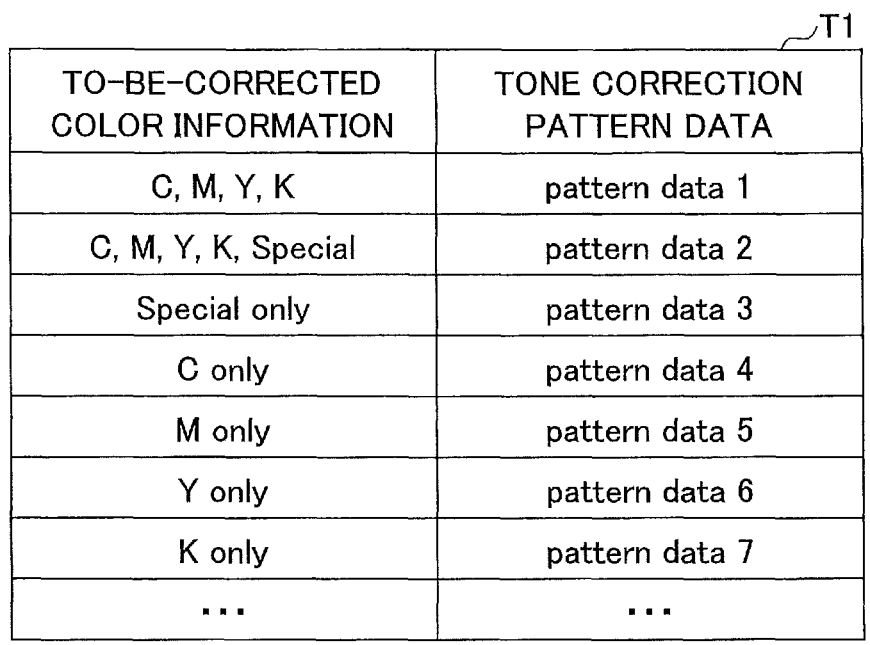
FIG. 6 depicts an example of a table T1, stored in a storage unit, where to-be-corrected color information is associated with tone correction pattern data.

FIG. 6 is an example of table T1 in which the to-be-corrected color information is associated with the tone correction pattern data, stored in the storage unit 509. By reading table T1 of FIG. 6, the rendering data generating unit 503 can obtain tone correction pattern data corresponding to the to-be-corrected color indicated by the to-be-corrected color information received from the reception unit 502. Table T1 is not limited to table T1 depicted, and data in which the pattern data is associated with the to-be-corrected colors, i.e., C, M, and a special color is sufficient.

The color material type obtaining unit 504 obtains color material type information regarding the types of the color materials provided by the image forming apparatus 103 from the image forming control unit 507 that will be described later. The color material type obtaining unit 504 outputs the obtained color material type information to the tone characteristic obtaining unit 505.

The tone characteristic obtaining unit 505 obtains the to-be-corrected color information from the reception unit 502. The tone characteristic obtaining unit 505 obtains the color material type information obtained by the color material type obtaining unit 504.

The tone characteristic obtaining unit 505 obtains the standard value of the to-be-corrected color with respect to each tone value from the storage unit 509 on the basis of the to-be-corrected color information. The tone characteristic obtaining unit 505 may obtain the standard value of the to-be-corrected color with respect to each tone value from the storage unit 509 on the basis of the color material type information as well as the to-be-corrected color information.

The tone characteristic obtaining unit 505 outputs the obtained to-be-corrected color information, the color material type information, and the standard value to the tone correction unit 506.

The tone correction unit 506 receives the to-be-corrected color information, the color material type information, and the standard value from the tone characteristic obtaining unit 505. The tone correction unit 506 obtains measured color data that is a result of measuring, by the user using a colorimeter, a color of an image (a tone correction pattern image) formed on paper on the basis of the rendering data generated by the rendering data generating unit 503 on the basis of the tone correction pattern data.

In the present embodiment, a case in which the image forming apparatus is not provided with the colorimeter will be described. However, the image forming apparatus may include a colorimeter. In this case, because the image forming apparatus measures a tone correction pattern image using the colorimeter, the user does not need to measure the tone correction pattern image separately.

The image forming apparatus 103 includes an image forming control unit 507 and an image forming unit 508. The functional configuration of the image forming apparatus 103 is not limited to the configuration depicted in FIG. 5, and may further include functional units depending on an embodiment or the like. The image forming control unit 507 is implemented by executing a program stored in the ROM 302 by the CPU 301. The image forming unit 508 is implemented by the image forming unit 306.

The image forming control unit 507 controls the image forming unit 508 on the basis of the rendering data received from the rendering data generating unit 503 and forms an image on paper.

<Example of Overall Processing>

Figure 7:
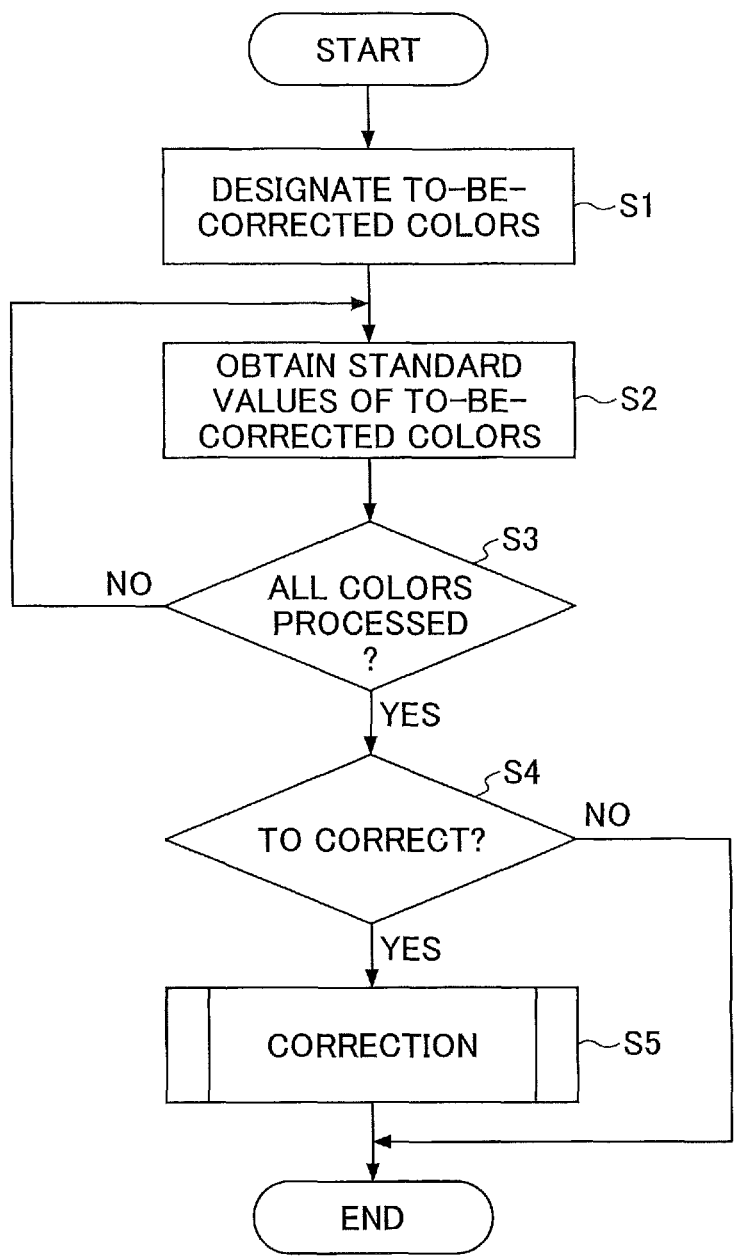
FIG. 7 is a flowchart depicting an overall process.

FIG. 7 is a flowchart depicting an overall processing example (Example of Designation of To-Be-Corrected Color)

In step S1, from a screen page displayed by the display unit 501, the reception unit 502 receives a designation of a to-be-corrected color from the user and outputs the to-be-corrected color information to the rendering data generating unit 503 and the tone characteristic obtaining unit 505.

Figure 8A:
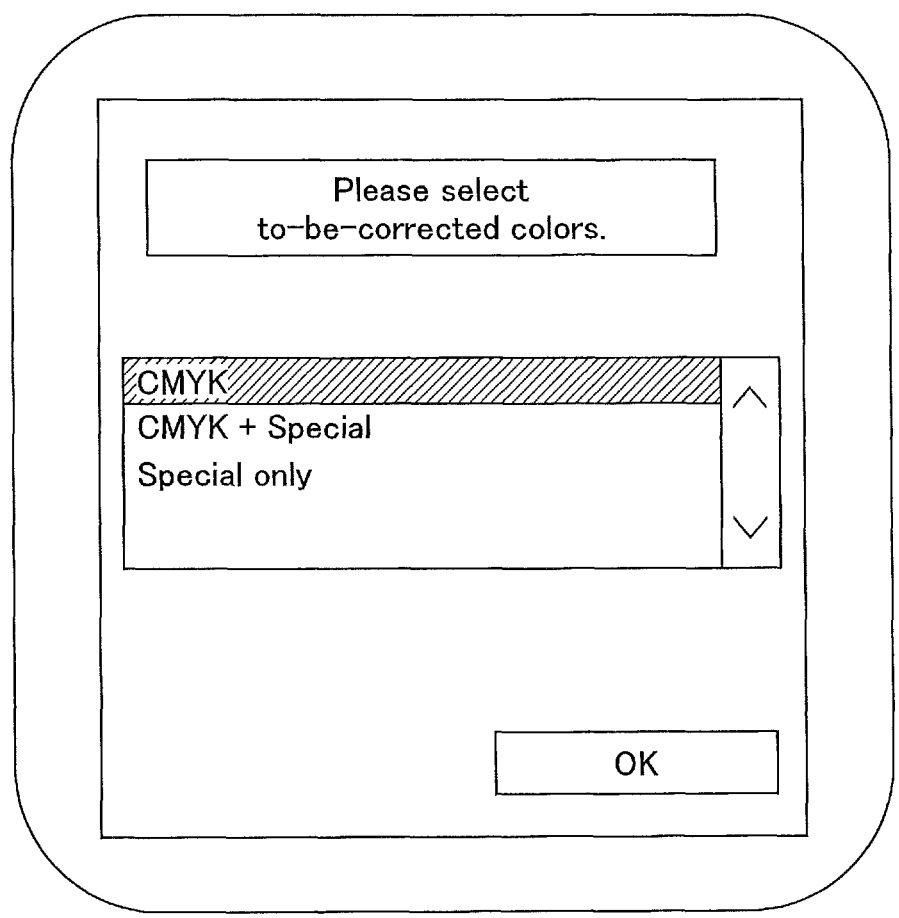
FIGS. 8A and 8B depict examples of screen pages displayed by a display unit.
Figure 8B:
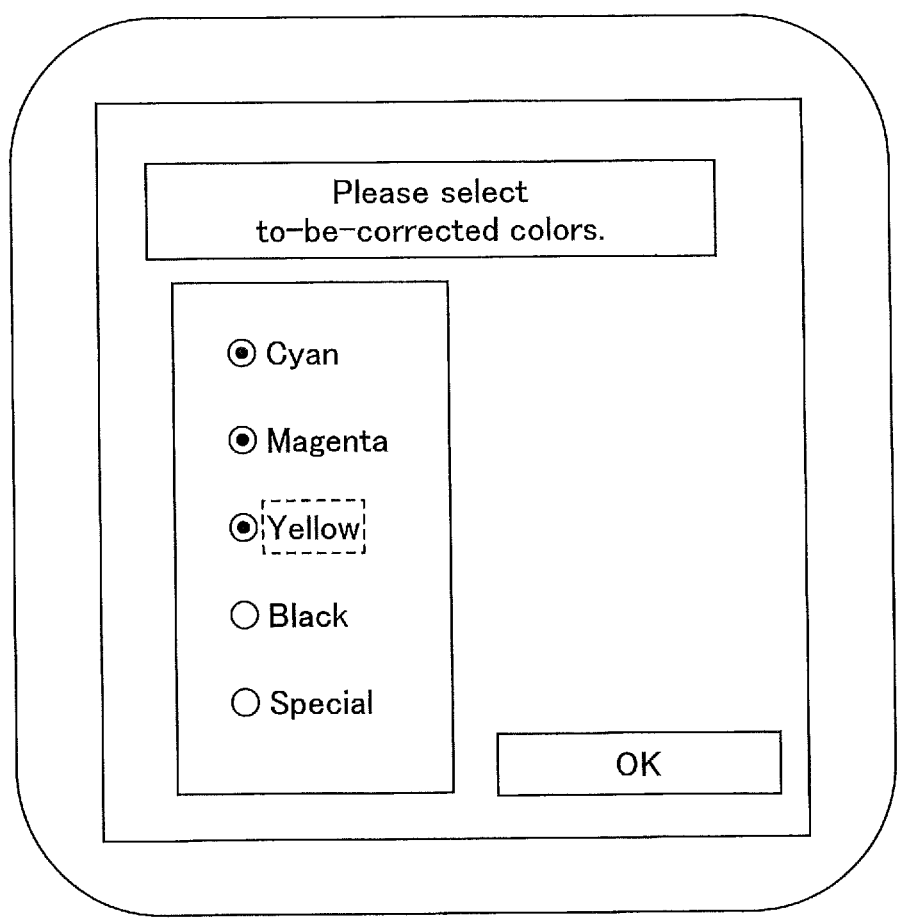

FIGS. 8A and 8B depict examples of screen pages displayed by the display unit 501. Hereinafter, an example in which the image forming apparatus is capable of forming an image using five colors in total by combining four colors of CMYK and one special color as depicted in FIGS. 8A and 8B will be described. The present invention is not limited to this way, and the image forming apparatus may be capable of forming an image using for colors CMYK and two or more special colors.

For example, the display unit 501 displays a GUI of either FIG. 8A or FIG. 8B. The GUI for a user to designate a to-be-corrected color may be a GUI other than that depicted in FIG. 8A or 8B.

FIG. 8A depicts a screen page for the user to select a predetermined combination of color materials. When the user selects a combination of color materials (the hatched area in FIG. 8A indicates the selected combination of color materials) and clicks the "OK" button, the reception unit 502 receives the selected combination of color materials as the designation of to-be-corrected colors.

FIG. 8B depicts a screen page from which any combination of color materials is selectable by the user. When the user selects color materials (the marks "●" in FIG. 8B indicate the selected color materials) and clicks the "OK" button, the reception unit 502 receives the selected combination of the color materials as the designation of to-be-corrected colors.

A special color mentioned above may be fluorescent yellow, fluorescent pink, white, clear, metallic, or a combination of any ones of these colors. Two or more special colors may also be used. In addition, each color may be changed to another color by replacing the toner. Hereinafter, an example using a special color will be described.

In the example depicted in FIG. 8A, when any one of the four colors "CMYK" or all of the four colors are designated as the to-be-corrected colors, a choice of "CMYK" can be selected to designate CMYK as the to-be-corrected colors.

Similarly, "CMYK+Special" is a choice used to designate both the CMYK and the special color as the to-be-collected colors.

In addition, "Special only" is a choice used to designate the special color as the to-be-corrected color.

As described above, a color input from the UI or the like is designated as the to-be-corrected color, and will be processed in a correction process and so forth at a later stage.

(Example of Obtaining Standard Value of To-Be-Corrected Color)

In step S2, the tone characteristic obtaining unit 505 obtains the standard value of the designated color (that is, the to-be-corrected color) from the storage unit 509. For example, if Black (K) is designated, the standard value of Black (K) is obtained.

The standard value is an ideal value obtained when the tone that is formed on a recording medium on the basis of image data of a tone patch, a so-called test chart, or the like is measured by a colorimeter. The standard value may be previously set, or the user may register the measured color value obtained from the color measurement result of the image of the tone patch as the standard value.

The standard value may be, for example, density, brightness, chromaticity, saturation, gloss, a combination of any of these quantities, or the like. The sensor may be also an optical scanner or the like. In this case, the standard value is, for example, an RGB value. In this regard, the standard value may be a Lab value or the like from converting a RGB value. In addition, the tone correction patterns are previously provided as follows.

FIG. 9 is a diagram illustrating an example of a screen page displayed by the display unit when black (K) is designated as a to-be-corrected color. Hereinafter, an example in which the UI depicted is used will be described. In this example, thumbnail images of printed matters in which images of tone correction patterns are formed are displayed on a screen page. Such a screen page indicates to the user which part is to be measured. For example, when "CMYK" or "CMYK+Special" is designated, a screen page as depicted is displayed because "K" ("Black") is included. This example also depicts a standard value indicated by an arrow to the user.

For example, when cyan (C) is designated, the screen page that will now be described is displayed.

Figure 10:
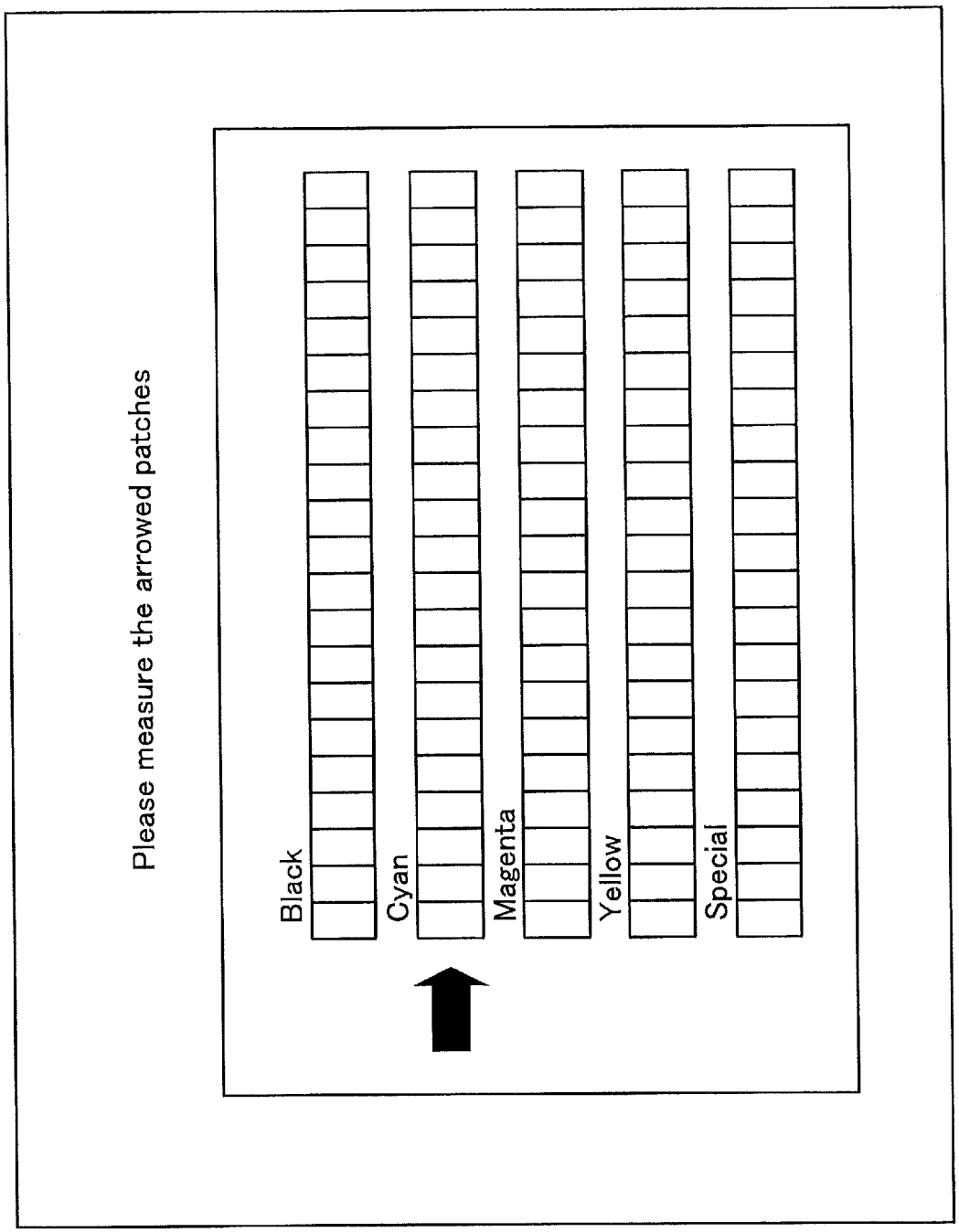
FIG. 10 depicts an example of a screen page displayed by the display unit when cyan (C) is designated as a to-be-corrected color.

FIG. 10 is a diagram illustrating an example of a screen page displayed by the display unit when cyan (C) is designated as a to-be-corrected color. Compared to FIG. 9, the arrow points differently to "Cyan" in FIG. 10.

Figure 11:
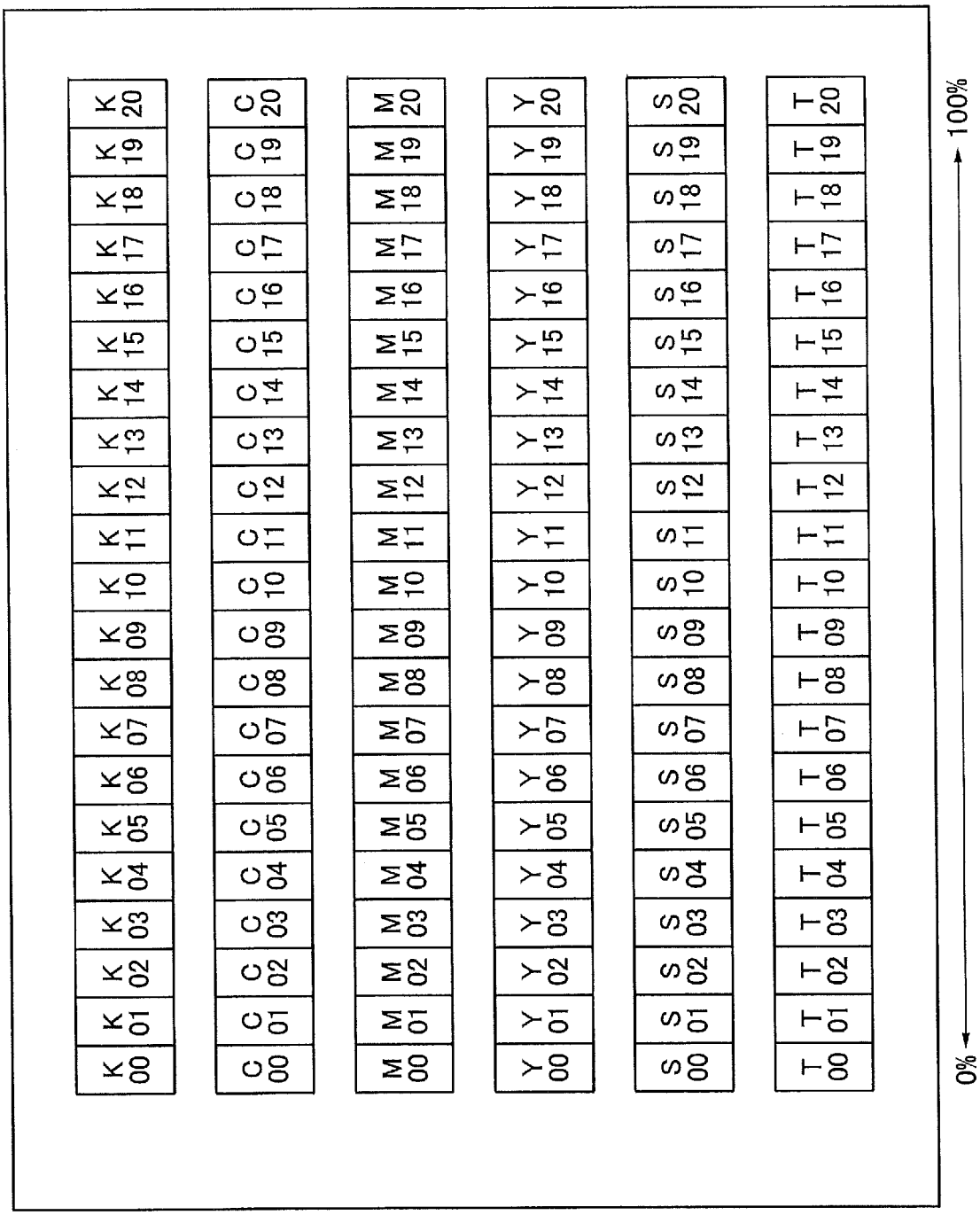
FIG. 11 depicts an example of tone correction patterns.

FIG. 11 depicts an example of tone correction patterns. For example, as depicted in FIG. 11, a tone correction pattern is prepared for each color, such as "K", "C", "M", "Y", "S", and "T". As depicted in FIG. 11, tone correction patterns are generated each having 21 tone units, for example, "00" through "20". In this example, "0%" through "100%" are graded by "5%" steps, such as "0%", "5%", "10%", . . . , "95%", and "100%". Accordingly, for a case where the data is changed equally for each tone unit and the data is changed in a range of 8 bits, that is, "0" through "255", a tone correction pattern is generated such that the value of the data changes by "255/100" for one tone unit. The number of steps and bits may be different depending on particular settings.

When an image of such a tone correction pattern is formed and the formed image of the tone correction pattern is measured by a spectrophotometer or the like, the image processing apparatus 102 can obtain characteristic values or the like that are a color measurement result. In more detail, in colors of CMYK, characteristic values are densities or the like. In a case of a special color, characteristic values may vary depending on the color. For example, in the case of fluorescent pink, the characteristic values are a* of L*a*b*. In the case of fluorescent yellow, the characteristic values are b* of L*a*b*. Furthermore, in the case of white, the characteristic values are L* of L*a*b*.

Therefore, in order to obtain characteristic values, a process such as converting measured values may be performed.

These values are values that vary greatly as an area tone ratio increases and are such indexes with which it is possible to obtain a wide dynamic range. Therefore, it is possible to implement accurate tone correction.

(Example of Determining whether All Colors have been Processed)

In step S3, the tone characteristic obtaining unit 505 determines whether the characteristic values have been obtained for all of the designated colors.

Next, when it is determined that the characteristic values have been obtained for all of the designated colors (YES in step S3), the image processing apparatus 102 proceeds to step S4. When it is determined that the characteristic values have not been obtained for all of the designated colors yet (NO in step S3), the image processing apparatus 102 proceeds to step S2.

Thus, step S2 and so forth are repeated until the characteristic values have been obtained for all of the designated colors.

(Example of Determining whether to Perform Correction)

In step S4, the tone correction unit 506 determines whether to perform correction.

For example, step S3, step S4, and so forth may be performed with the use of a screen page that will now be described.

Figure 12:
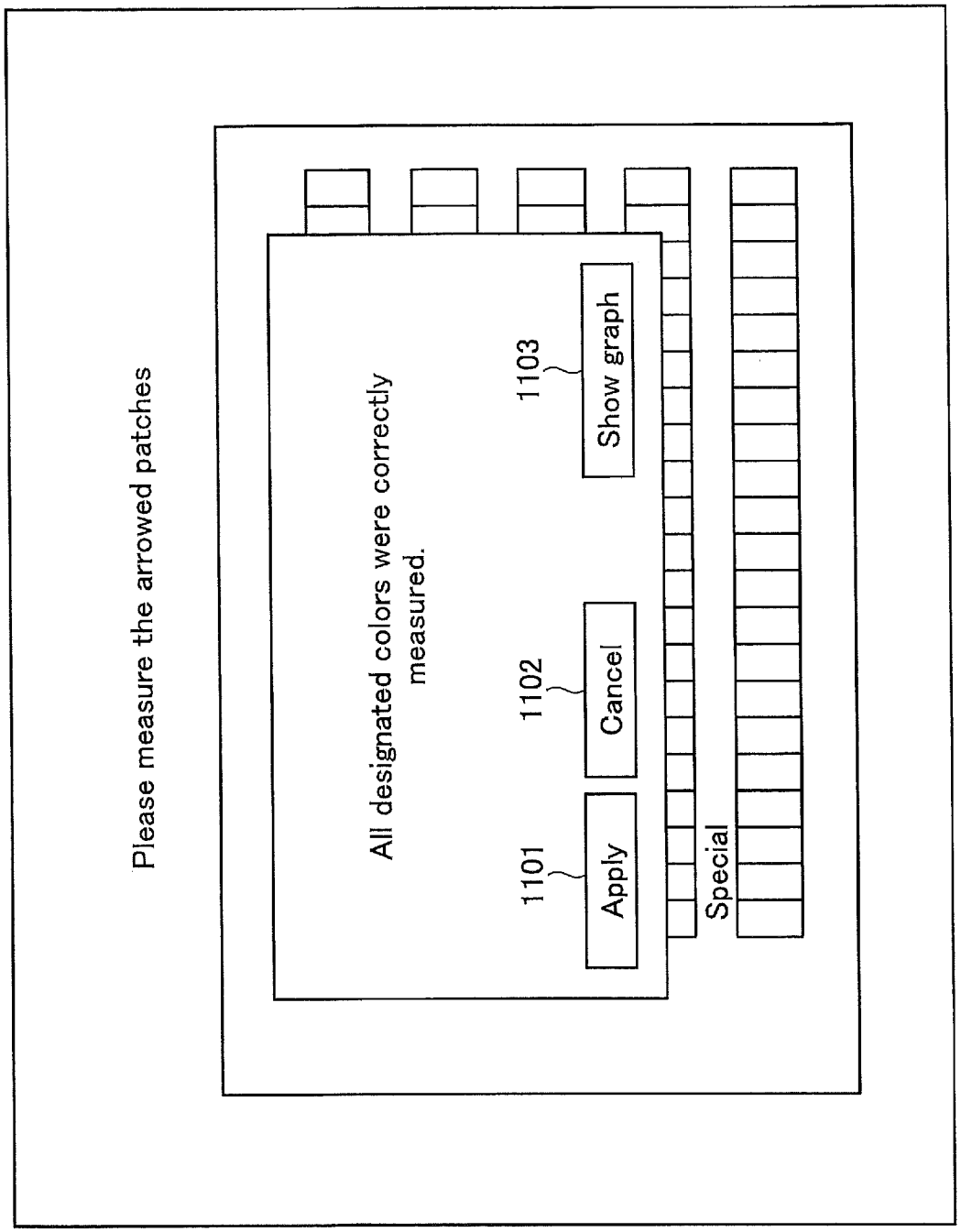
FIG. 12 depicts an example of a screen page displayed by the display unit.

FIG. 12 depicts an example of a screen page displayed by the display unit. In the example depicted in FIG. 12, the user can press the button of "Apply" (hereinafter referred to as a "first button 1101"), the button of "Cancel" (hereinafter referred to as a "second button 1102"), or the button of "Show graph" (hereinafter referred to as a "third button 1103").

For example, by pressing either the first button 1101 or the second button 1102, the user can select whether to perform correction thereafter. When a button is thus pressed by the user, the reception unit 502 outputs information corresponding to the pressed button to the tone correction unit 506. For example, when the first button is pressed, the reception unit 502 outputs information indicating that correction is to be performed to the tone correction unit 506. When the second button is pressed, the reception unit 502 outputs information indicating that correction is not to be performed to the tone correction unit 506. When the tone correction unit 506 receives information indicating that correction is to be performed from the reception unit 502 (YES in step S4), the tone correction unit 506 performs tone correction. When the tone correction unit 506 receives information indicating that correction is not to be performed from the reception unit 502 (NO in step S4), the tone correction unit 506 determines that the entire process has been ended, without performing tone correction.

When the third button 1103 is pressed, the display unit 501 may display the screen page that will now be described, for example.

Figure 13:
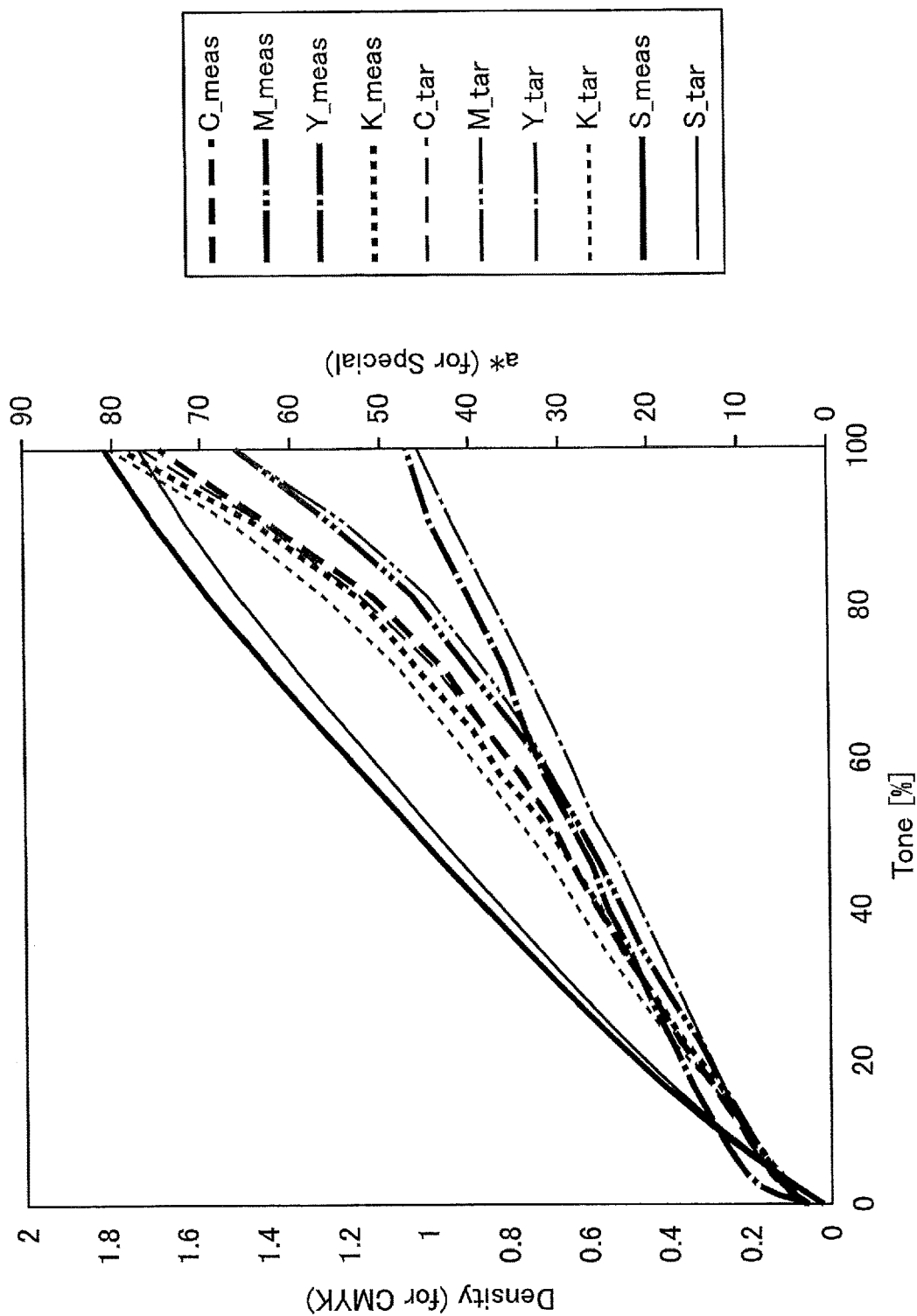
FIG. 13 depicts a state before correction and an ideal state.

FIG. 13 depicts an example of a state before correction and an ideal state. The example depicted in FIG. 13 is an example in which to-be-corrected colors are designated as "CMYK+Special". Thus, this example displays the states of five colors, but the states to be displayed may be the state of the designated colors. Therefore, in this example, in order to display the screen page depicted in FIG. 13, the tone correction pattern of each color is formed and measured to obtain the states before correction. Further, in this example, the standard value for each color is obtained as an ideal state.

In FIG. 13, "xx_meas" (actually, the letters "xx" are the letters indicating any one of "C", "M", "Y", "K", and "S"; hereinafter description being made in the same manner) indicates the state before correction, i.e., the current state, and depicts the result of actually measuring the tone correction pattern.

On the other hand, "xx_tar" indicates the ideal state, i.e., the expected state after the correction. The vertical axis indicates the density of CMYK as an index. The vertical axis indicates the value of "a*" for "S".

Accordingly, when a screen page, such as a graph depicted in FIG. 13, is displayed, the user can understand the tone characteristics before correction and the expected values, so that the user can know a defect, a color for which correction is desirable, or an expected effect of correction.

Thus, a screen page as depicted may be displayed to assist in designating which colors are to be corrected, for example.

Next, when it is determined that correction is to be performed (YES in step S4), the tone correction unit 506 proceeds to step S5. When it is determined that correction is not to be performed by the tone correction unit 506 (NO in step S4), the process ends.

(Example of Correction)

In step S5, the tone correction unit 506 performs tone correction. For example, as depicted in FIG. 13, the correction is a process of obtaining an ideal state by reducing the difference between the state before correction that can be obtained from the formed image of the tone correction pattern and the ideal state indicated as the standard values. In more detail, the correction is processed as follows.

Figure 14:
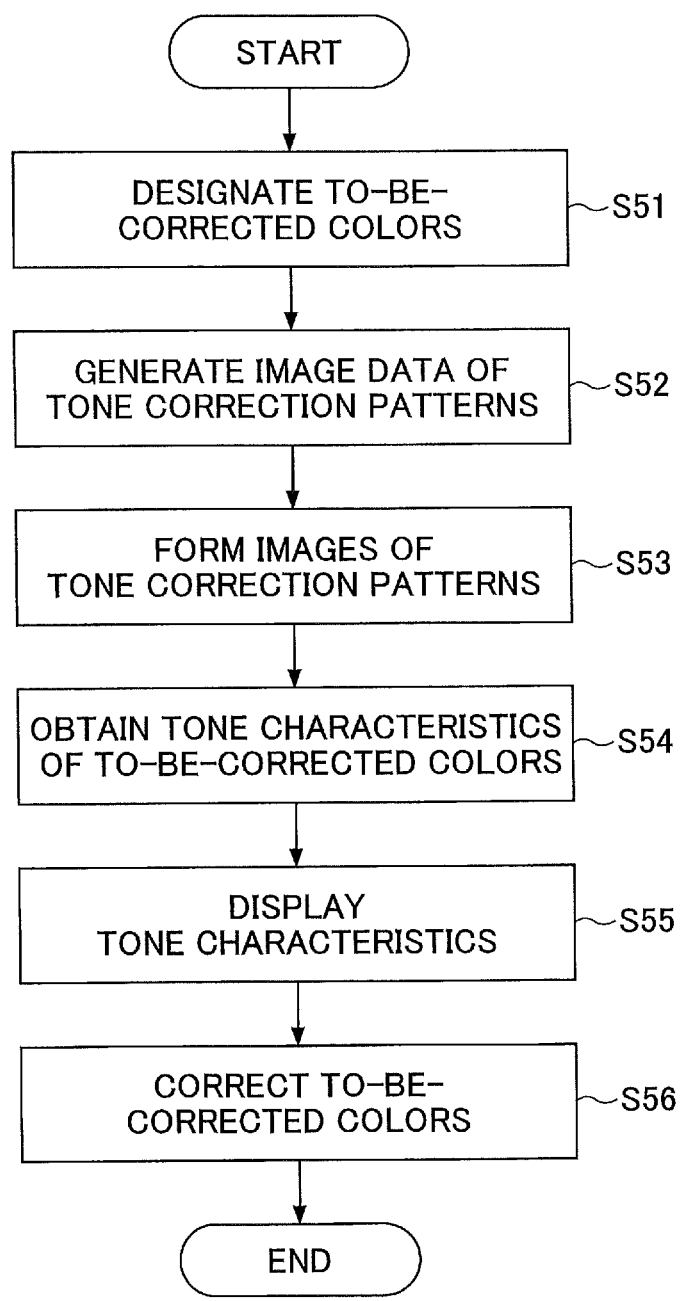
FIG. 14 is a flowchart depicting an example of correction processing.

FIG. 14 is a flowchart illustrating an example of processing correction. Note that any of the steps depicted in FIG. 14 may be omitted because it is not necessary to execute the step in duplicate if the step is already performed in the past (in FIG. 7 or the like).

(Example of Designating To-Be-Corrected Color)

In step S51, the reception unit 502 designates to-be-corrected colors.

(Example of Generating Image Data of Tone Correction Patterns)

In step S52, the rendering data generating unit 503 generates image data of tone correction patterns.

(Example of Forming Images of Tone Correction Patterns)

In step S53, the image forming control unit 507 forms tone correction patterns on a recording medium on the basis of the image data.

(Example of Obtaining Tone Characteristics of To-Be-Corrected Colors)

In step S54, the tone characteristic obtaining unit 505 obtains tone characteristics or the like of the to-be-corrected colors. That is, the tone characteristic obtaining unit 505 selects to-be-corrected colors and measures the characteristic values using an optical scanner or the like.

(Example of Indicating Tone Characteristics or the Like)

In step S55, the display unit 501 displays the tone characteristics or the like.

(Example of Correcting To-Be-Corrected Color)

In step S56, the tone correction unit 506 corrects the to-be-corrected colors.

Hereinafter, an example in which the to-be-corrected color is white, which is an example of a special color, will be described. First, data that will now be described is previously generated in the image processing apparatus 102 through calculation or the like.

Figure 15:
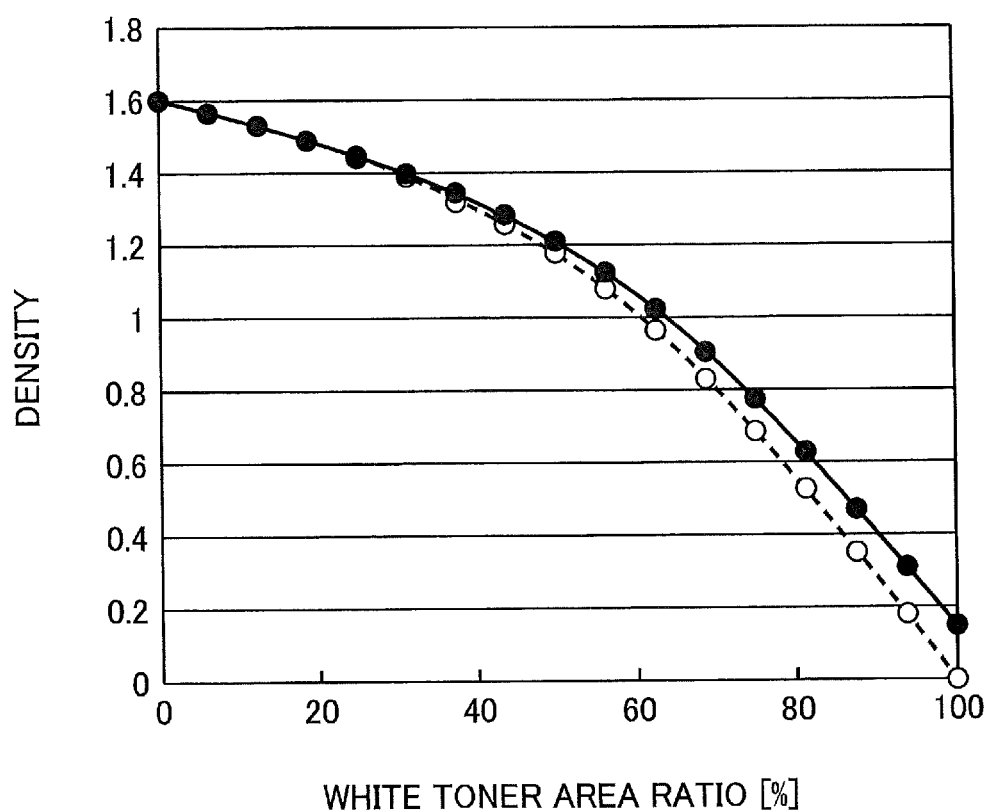
FIG. 15 depicts an example of relationships between a white toner area ratio and an expected value of a density, and an example of relationships between a white toner area ratio and a corrected density (corrected measured value)

FIG. 15 depicts an example of relationships between the white toner area ratio and the expected values of the density, and an example of relationships between the white toner area ratio and the corrected densities (corrected measured values). The results depicted in FIG. 15 are, for example, the calculation results of Formula (1) and Formula (2) below.

$$\text{(Correcting amount)} = \text{(Measured value of } W00) - \text{(Expected value of } W00) \quad (1)$$

"Measured value of W00" in Formula (1) above is the result of using a "patch having a white toner area ratio of 0%" (equivalent to "S00" in FIG. 11) to form an image and measuring the image using a scanner or the like. "Expected value of W00" is the density of white in the ideal state. Therefore, the difference between "Measured value of W00" and "Expected value of W00", which is calculated as depicted in equation (1) above, is a value of a change from the ideal state, and is a value that should be canceled by correction, that is, the correcting amount.

$$\text{(Corrected measured value)} = \text{(Measured value of } Wi) - \text{(Correcting amount)} \quad (2)$$

The "Correcting amount" in Formula (2) is the "Correcting amount" calculated by Formula (1) above. The sign "i" in Formula (2) above denotes another zone, and "Wi" is, for example, "W01". Therefore, the corrected measured value is obtained from subtracting the correcting amount from "Measured value of Wi" which is the result of measurement using a scanner or the like. The relationships between the white toner area ratios, the expected values, the measured values, and the corrected measured values are as follows (see Table 1).

TABLE 1

| white tonner area ratio | expected value | measured value | corrected measured value |
|---|---|---|---|
| 0 | 1.60 | 1.650 | 1.600 |
| 6 | 1.57 | 1.617 | 1.567 |
| 13 | 1.54 | 1.584 | 1.534 |
| 19 | 1.50 | 1.540 | 1.490 |
| 25 | 1.45 | 1.485 | 1.435 |
| 31 | 1.40 | 1.430 | 1.380 |
| 38 | 1.34 | 1.364 | 1.314 |
| 44 | 1.29 | 1.309 | 1.259 |
| 50 | 1.22 | 1.232 | 1.182 |
| 56 | 1.14 | 1.144 | 1.094 |
| 62 | 1.02 | 1.012 | 0.962 |
| 69 | 0.90 | 0.880 | 0.830 |
| 75 | 0.77 | 0.737 | 0.687 |
| 81 | 0.63 | 0.583 | 0.533 |
| 87 | 0.47 | 0.407 | 0.357 |
| 94 | 0.31 | 0.231 | 0.181 |
| 100 | 0.15 | 0.055 | 0.005 |

Figure 16:
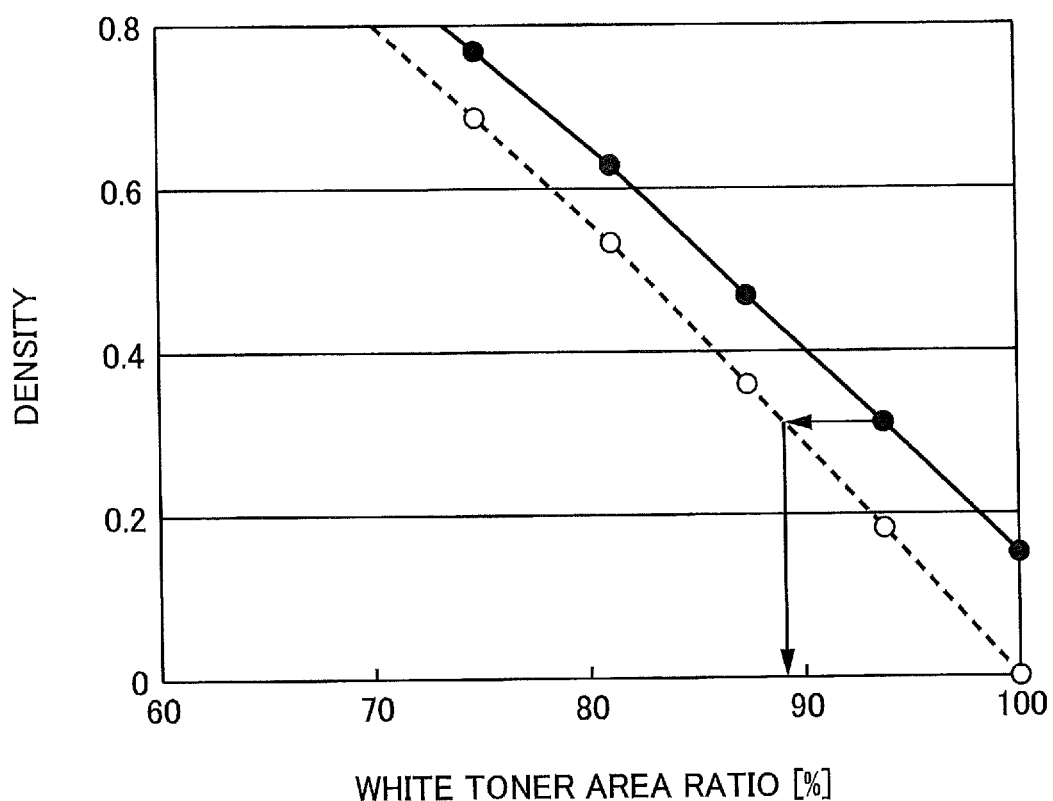
FIG. 16 depicts an example of generating a parameter for correction.

FIG. 16 is an example of generating parameters for correction. In FIG. 16, the dotted line with white circles is a graph depicting the relationships of the corrected measured values to the white toner area ratios. Further, the solid line with black circles is a graph depicting the relationships of the expected values of density to the white toner area ratios.

When the corrected measured values are almost equal to the expected values, the tone correction unit 506 need not perform correction, i.e., maintains the state. In this case, the parameters for correction or the like are set not to perform correction accordingly, for example.

On the other hand, in the example depicted in FIG. 16 (in more detail, the white toner area ratio is approximately 94%; hereinafter, the example in which the white toner area ratio is 94% indicated by the arrows), and the expected density is "0.31", will be described. In this regard, the corrected measured value is "0.181". This is an example where the corrected measured value is not equal to the expected value. For example, such a case is a case where correction is needed.

Such a phenomenon may occur, for example, due to a variation in density due to a temporal change in a component or an assembling section in the image forming apparatus. The state of the depicted example is a state in which the white toner area ratio is smaller than the ideal value to achieve the expected density.

For example, the tone correction unit 506 calculates the white toner area ratio achieving each density by linear interpolation or the like. In this way, the tone correction unit 506 calculates the parameter for correction for each density. In more detail, the tone correction unit 506 first detects an adjacent corrected measured value higher than the expected density value and an adjacent corrected measured value lower than the expected density value. In this example, two points of white toner area ratios "87%" and "94%" are detected. Next, the tone correction unit 506 linearly interpolates the two points to calculate the white toner area ratio corresponding to the expected value of the density. That is, the linear interpolation yields "89.1%" in this example.

Thus, as a result of the "89.1%" white toner ratio being allocated to an image for which the white tonner area ratio data "94%" has been required, the variation in density due to the change over time can be corrected, that is, the tone characteristics for achieving the standard value can be obtained.

An area ratio can be converted to a 8-bit tone value data by multiplying by "255/100". In more detail, the tone value corresponding to "89.1%" is "227" and the tone value corresponding to "94%" is "240".

Through a calculation such as that described above, a conversion table for obtaining 16 discrete tone values corresponding to density standard values is generated. The tone correction unit 506 interpolates the 16 tone values of the conversion table using spline interpolation or the like. For example, using such an interpolation operation or the like, parameters for correction are generated at 1 tone intervals for tone values "0" through "255".

Thus, the correction is implemented, for example.

As described above, the correction is performed on a color designated as a to-be-corrected color. If all the colors will be processed in the correction, because image forming processes and so forth cannot be performed during the time required to perform the correction, so-called downtime may occur for a considerable time. Therefore, it is desirable to reduce the time for processing the correction or the like. In particular, some colors may be unused even if the correction is performed for all the colors. For example, when an area using a special color is not included in an image to be formed, correction of the special color may increase the downtime unnecessarily. In addition, for example, there may be a case of forming such an image that will now be described.

Figure 17:
FIG. 17 depicts an example of forming an image using white.

FIG. 17 depicts an example of forming an image using white. The example depicted in FIG. 17 is an example in which the CMYK colors are not required when the image depicted in FIG. 17 is formed on a black sheet. In such a case, correction of CMYK is not necessary.

As described above, depending on an image to be actually formed, there may be a case where only a specific color, is used. Therefore, as a result of designating a color to be actually used as a to-be-corrected color and performing correction for the to-be-corrected color, the number of colors to be corrected can be reduced. Thus, it is possible to reduce the processing time of correction by reducing the number of colors to be corrected. As a result, downtime or the like can be effectively reduced.

Second Embodiment

A second embodiment performs steps in addition to the steps described with respect to the first embodiment. Hereinafter, description will be made focusing on the different points, and duplicate description will be omitted.

Figure 18:
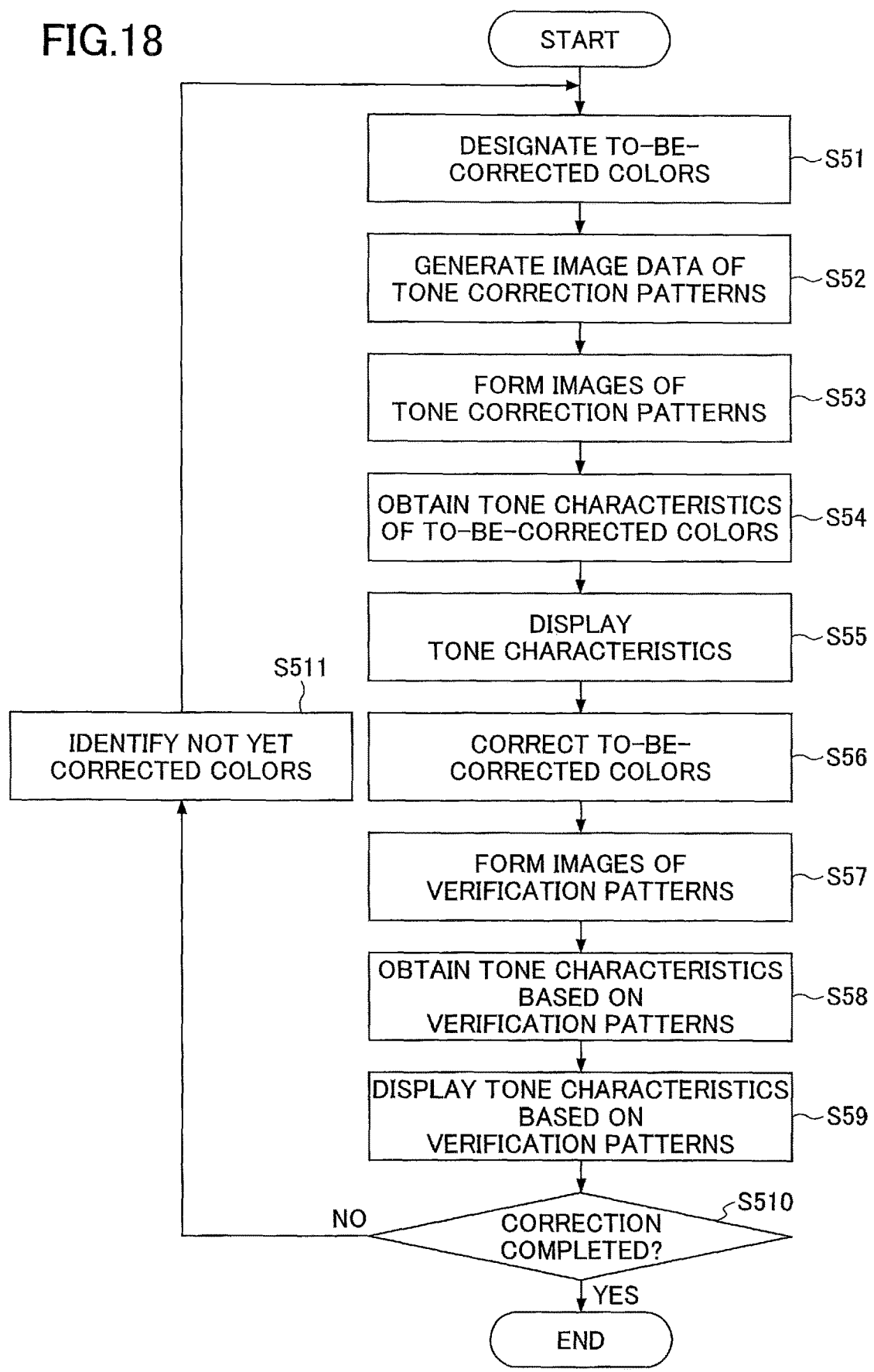
FIG. 18 is a flowchart depicting an example of correction processing according to a second embodiment.

FIG. 18 is a flowchart illustrating an example of processing of correction according to the second embodiment. The same steps as the steps of the first embodiment are denoted by the same reference numerals and the corresponding description is omitted. As depicted in FIG. 18, the second embodiment differs in that further steps (starting at step S57) are executed after the steps of the first embodiment.

(Example of Forming Verification Pattern)

In step S57, the image forming unit 508 forms images of verification patterns on a recording medium, for verification.

(Example of Obtaining Tone Characteristics or the Like on the Basis Of Verification Patterns)

In step S58, the tone characteristic obtaining unit 505 obtains the tone characteristics of the verification patterns obtained from measuring the colors of the verification pattern images formed on the recording medium with the use of a colorimeter.

(Example of Displaying Tone Characteristics or the Like on the Basis Of Verification Patterns)

In step S59, the display unit displays the tone characteristics obtained on the basis of the color measurement result obtained from measuring the colors of the verification pattern images.

(Example of Determining whether Correction has been Completed)

In step S510, the tone correction unit 506 determines whether the correction has been completed. For example, when the characteristic values indicated by the verification patterns, obtained from the color measurement of the verification patterns, are sufficiently close to the expected values, the tone correction unit 506 determines that the correction has been completed. For example, when the differences between the standard values and the characteristic values are less than or equal to a predetermined value, the tone correction unit 506 determines that the correction has been completed. As an example of the predetermined value, when the differences of density are 0.1 or less, the tone correction unit 506 may determine that the correction is completed. In this regard, this way is merely an example, and another way may be used instead. A standard value of brightness may be compared with the characteristic value of brightness, instead. The predetermined value may be 0.5 instead of 0.1.

Next, when the correction has been completed (YES in step S510), the process of FIG. 18 ends. However, when the correction has not been completed (NO in step S510), the process proceeds to step S511.

(Example of Identifying Color that has not been Corrected)

In step S511, the tone correction unit 506 identifies a color that has not been corrected. For example, the color being thus identified may be then designated as a to-be-corrected color, and may be processed by step S51 and so forth again. That is, for a color identified in step S511, the tone correction unit 506 may perform correction again.

There may be a case where correction cannot be performed satisfactorily. For example, even after tone or the like is corrected, an image with a clearly strong magenta may result, i.e., magenta color correction has not been able to be performed successfully.

The reason why correction has not been able to be performed successfully may be that same characteristic values have not been able to be obtained even if an image of the same pattern is formed, because, for example, the image forming apparatus has an in-plane unevenness or the like, or an error occurs in the sensor.

According to the second embodiment, as described above, after correction is made, verification patterns or the like are used to determine whether the correction is successful. Then, it is desirable to identify the color for which the correction is not successful, and to perform correction only on the color for which the correction is not successful. As a result, for a color for which correction is successful will be used as it is, while, only for a color for which correction is not successful, correction will be performed. Thus, the processing time of correction can be effectively reduced.

Third Embodiment

A third embodiment differs from the first embodiment in that tone correction patterns that will now be described are used.

Figure 19:
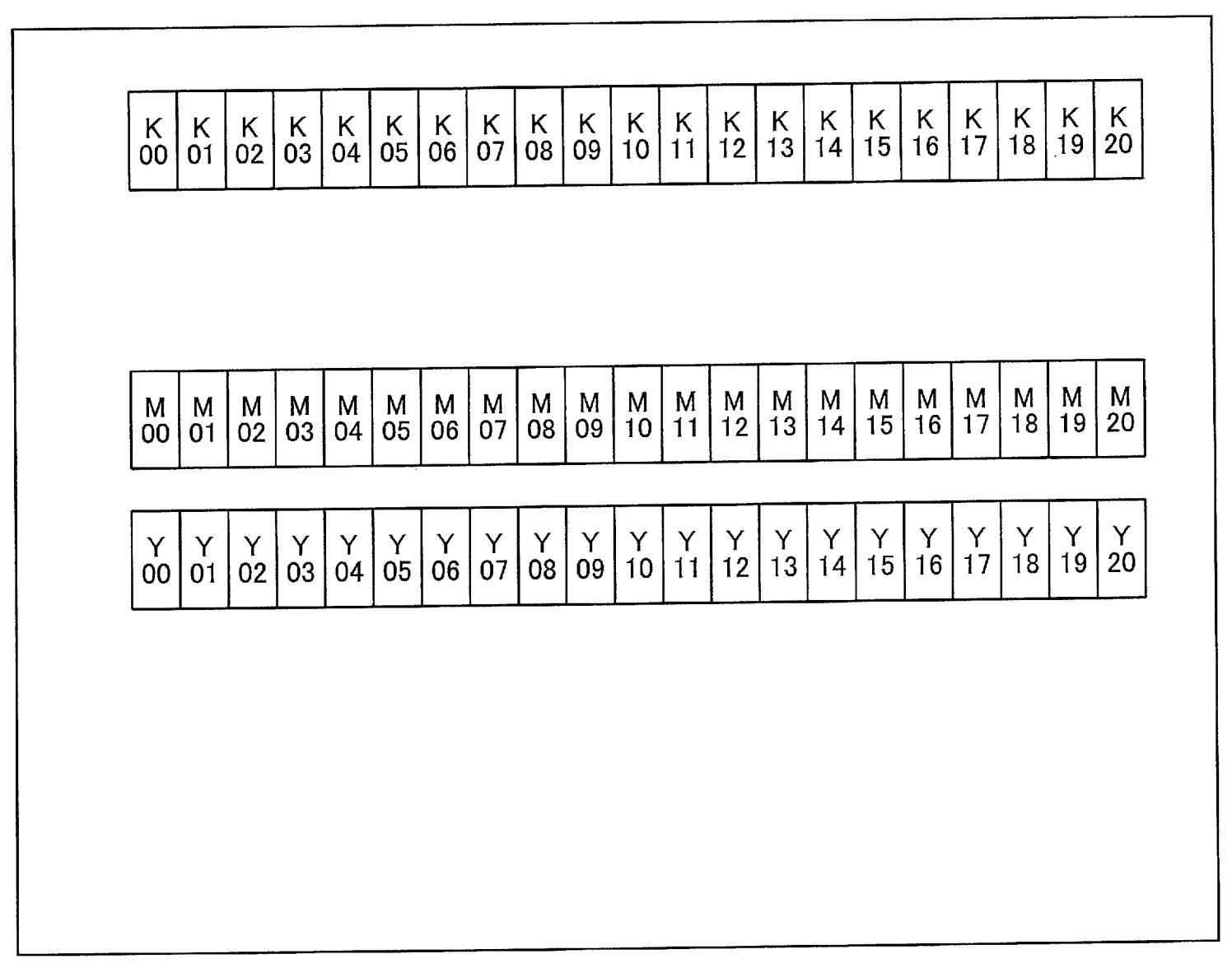

FIG. 19 depicts an example of tone correction patterns according to the third embodiment. The third embodiment differs from the first embodiment in that tone correction patterns of three colors of "K", "M", and "Y" are formed and tone correction patterns of the other colors are not formed. That is, the example depicted in FIG. 19 is an example in which the colors "K", "M", and "Y" are designated as to-be-corrected colors. Accordingly, correction or the like are performed in such a manner that will now be described, for example.

Figure 20:
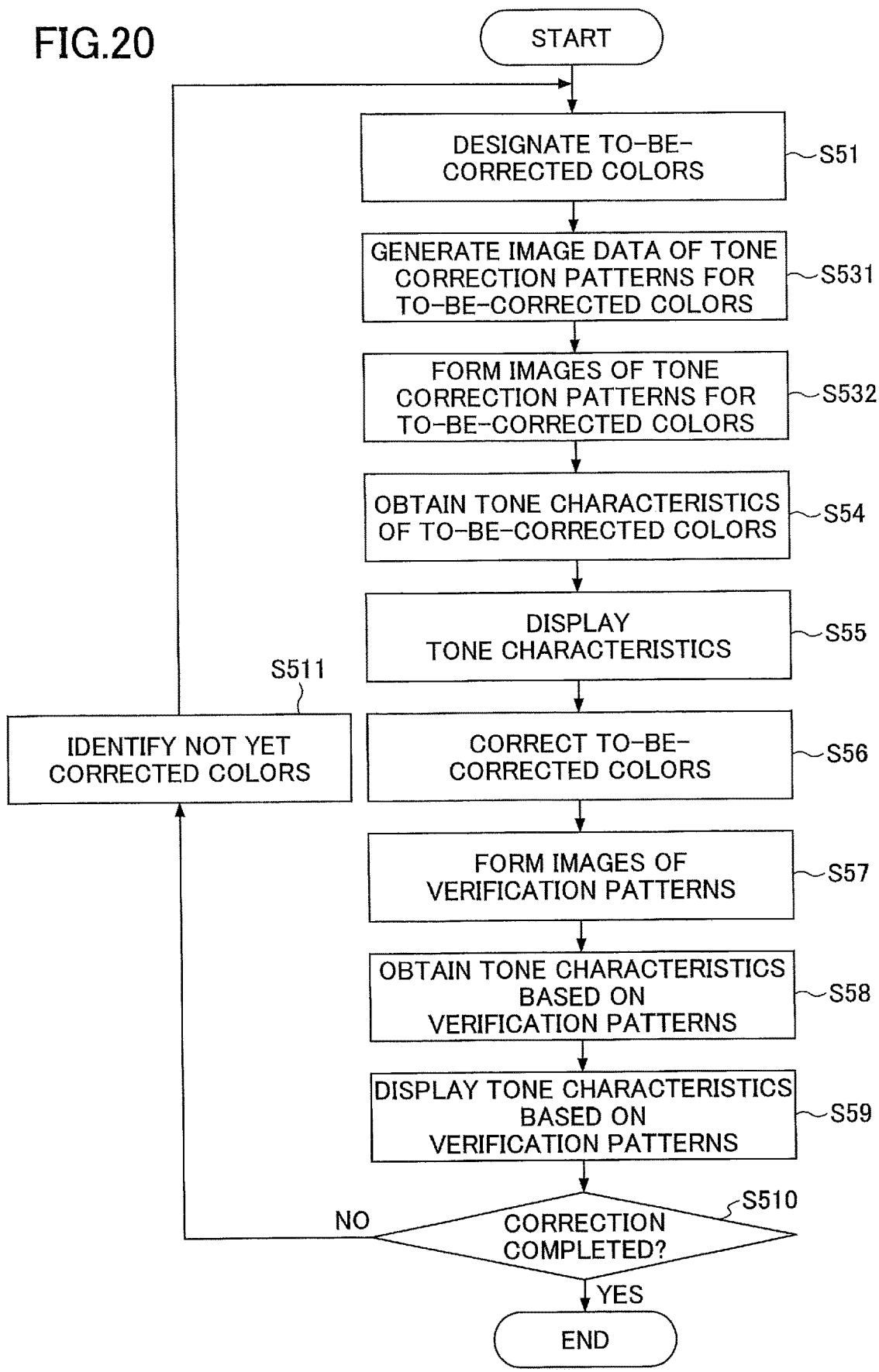
FIG. 20 is a flowchart depicting an example of correction processing according to the third embodiment.

FIG. 20 is a flowchart illustrating an example of a process of correction according to the third embodiment. Compared to the second embodiment, the third embodiment differs in step S531 and step S532. Hereinafter, mainly the different points will be described.

(Example of Generating Image Data of Tone Correction Patterns of To-Be-Corrected Colors)

In step S531, the rendering data generating unit 503 generates image data of tone correction patterns with respect to to-be-corrected colors. For example, image data of tone correction patterns as depicted in FIG. 19 is generated.

(Example of Forming Image of Tone Correction Patterns of To-Be-Corrected Colors)

In step S532, the image forming unit 508 forms images of the tone correction patterns of the to-be-corrected colors.

Thus, generation and image formation with respect to image data of tone correction patterns may be limited to these processes for the to-be-corrected colors. With such a configuration, also the toner consumption can be saved.

Fourth Embodiment

A fourth embodiment differs from the other embodiments in that a plurality of special colors are used. For example, the image processing apparatus 102 uses, in addition to the colors of CMYK, two colors from among white, clear, metallic, and a fluorescent color, such as fluorescent yellow or fluorescent pink. Hereinafter, a first special color of the two colors may be referred to as "S" and a second special color of the two colors may be referred to as "T".

Thus when two special colors are used, for example, image data of tone correction patterns as depicted in FIG. 11 are used.

Hereinafter, an example in which the special colors are fluorescent yellow and fluorescent pink will be described. If such colors are used, for example, fluorescent pink is used in place of magenta in CMYK. In addition, in a such case, yellow in CMYK is replaced with fluorescent yellow. Accordingly, even if there are six colors in total including CMYK and the special colors, image formation is often performed using four colors from among the six colors. Therefore, in this example, it is desirable that to-be-corrected colors are selected as follows, for example.

Figure 21:
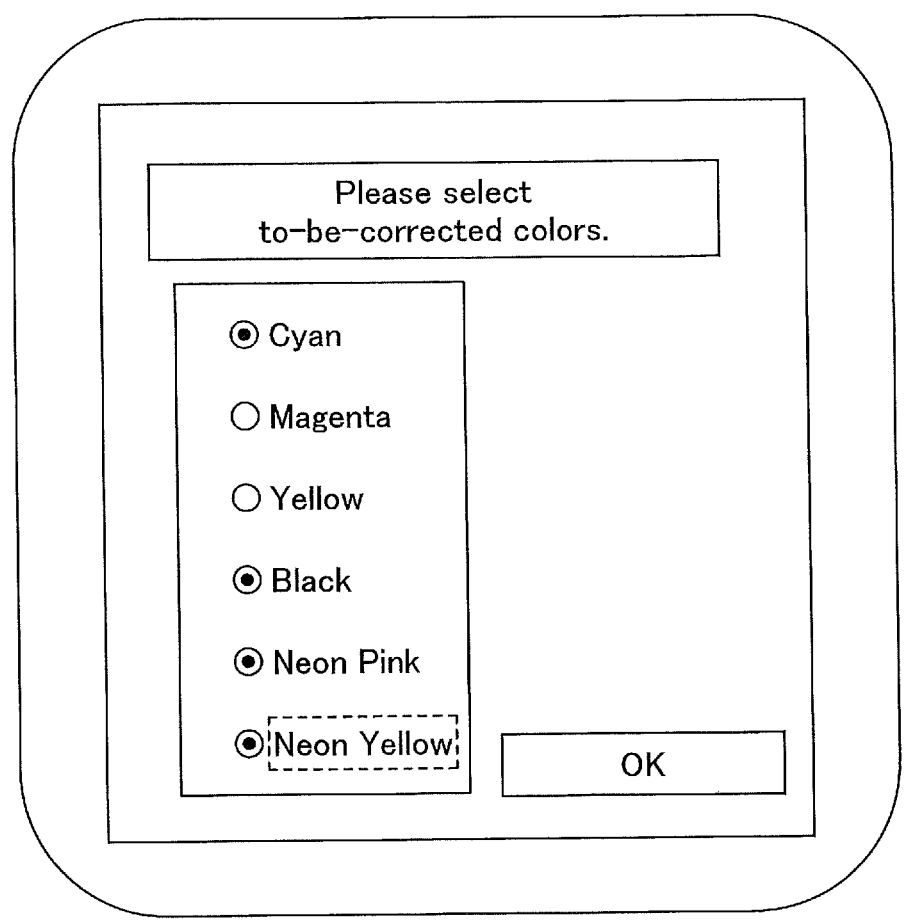
FIG. 21 depicts an example of a designation of a to-be-corrected color according to a fourth embodiment.

FIG. 21 is an example of designating to-be-corrected colors according to the fourth embodiment. That is, the example depicted in FIG. 21 is an example in which "Neon Pink" and "Neon Yellow" are designated as to-be-corrected colors in addition to "C" and "K" as to-be-corrected colors. On the basis of such designation, it is desirable that image data and image formation with respect to tone correction patterns be generated as follows, for example.

Figure 22:
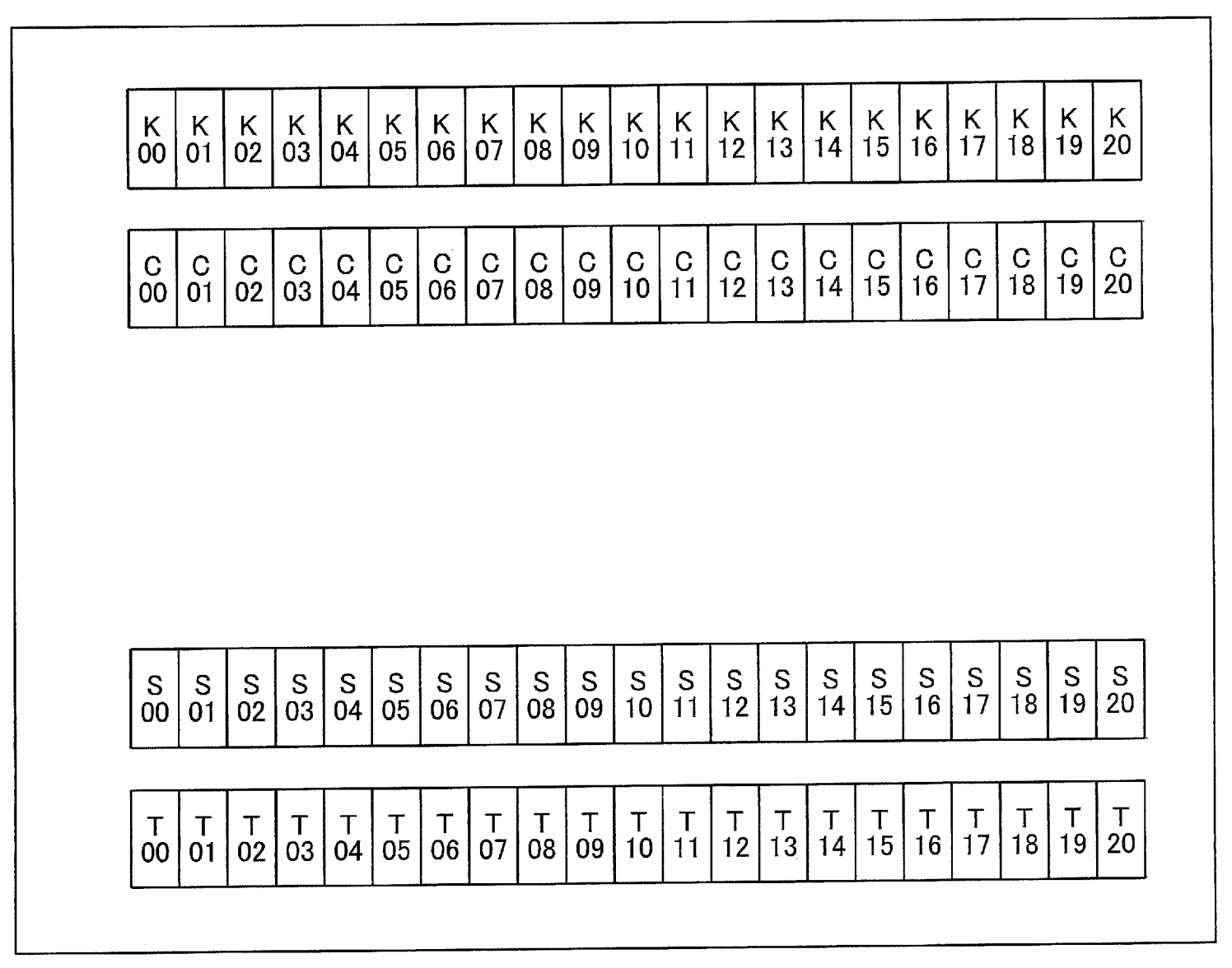

FIG. 22 depicts an example of tone correction patterns according to the fourth embodiment. In a case where fluorescent colors are used as the special colors, in consideration of the above-mentioned color replacement, it is desirable that, as a combination of to-be-corrected colors, as depicted in FIG. 22, the colors, from among CMYK, actually used for image formation, as well as the special colors, are designated. By designating to-be-corrected colors in such a way, the to-be-corrected colors can be made to be the same as the colors actually used. Therefore, useless color correcting processes can be reduced.

Fifth Embodiment

In a fifth embodiment, a combination of a color of a recording medium (hereinafter, referred to as a "recording medium color") and a special color is considered. Hereinafter, an example in which a recording medium color is black, and white is used as a special color will be described. For example, when an image such as that depicted in FIG. 17 is formed, such a combination of black and white is used.

In addition, even when the colors CMYK are used with a black recording medium, because reflection from the recording medium is small, weak coloring can be obtained in many cases. Therefore, for example, the following tone characteristics may be obtained.

Figure 23:
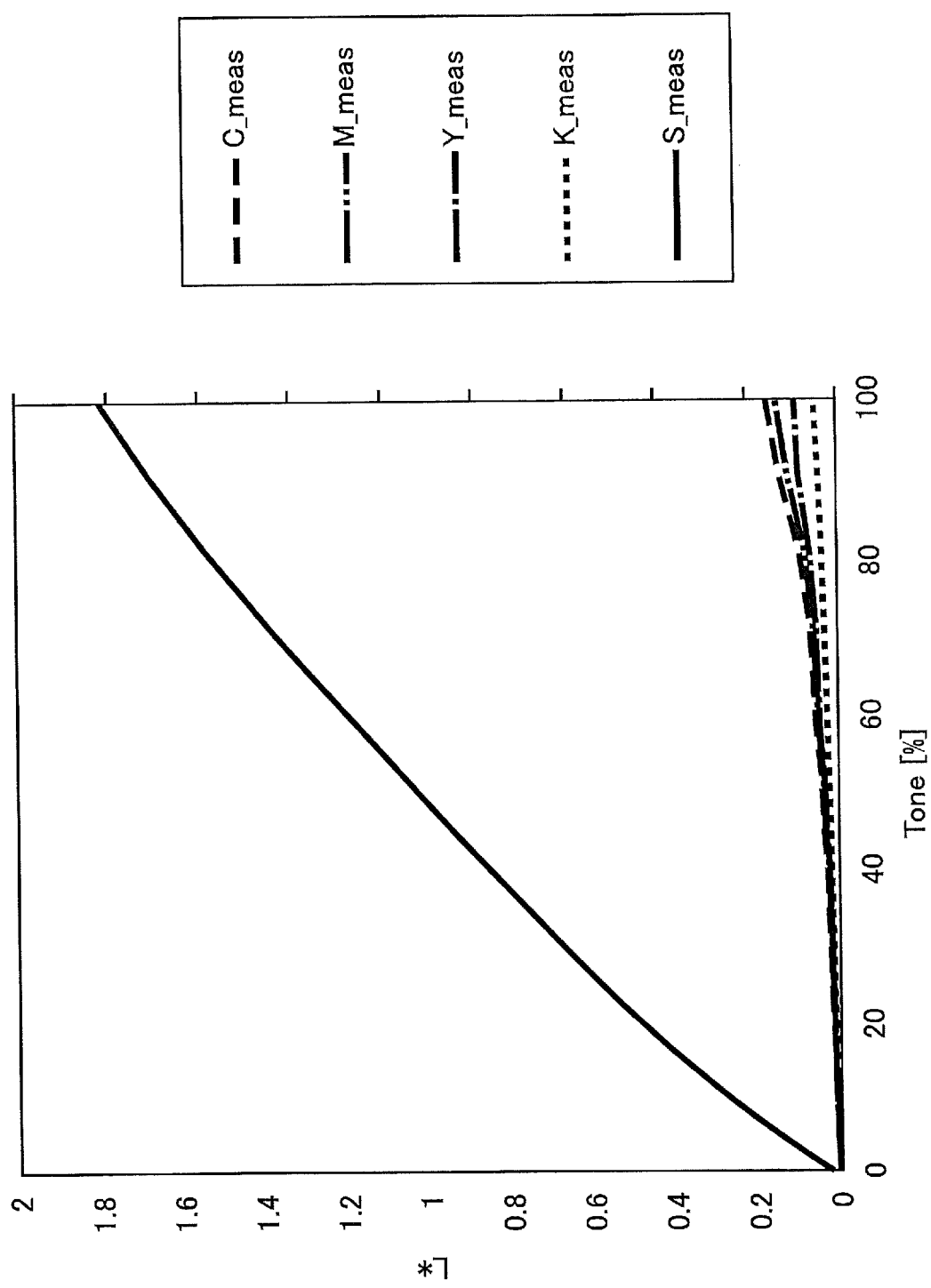
FIG. 23 depicts an example of tone characteristics according to a fifth embodiment.

FIG. 23 depicts an example of tone characteristics according to the fifth embodiment. As depicted, the characteristic values, such as densities, of the colors other than "S", i.e., other than white, hardly varies. Therefore, when the recording medium color is black, the colors CMYK are not used in many cases.

In addition, when a recording medium color is black, using the color "K" often makes it difficult to identify the border between patches. Therefore, it is desirable to carefully identify the position of each patch while making a measurement.

Therefore, when a recording medium color is black, it is desirable to make a setting such that image forming will be performed with white, that is, one special color. For example, such a setting can be implemented by the following overall process.

Figure 24:
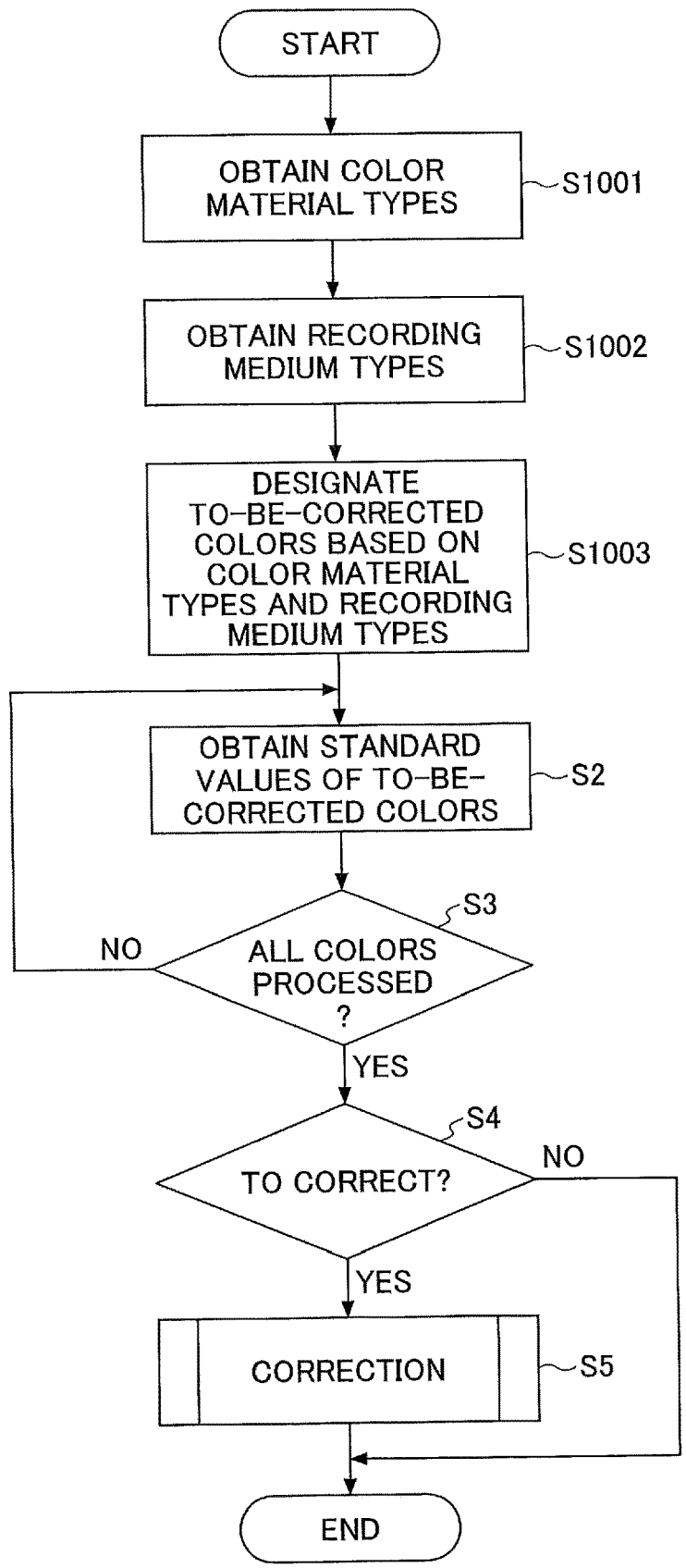
FIG. 24 is a flowchart depicting an overall process according to the fifth embodiment.

FIG. 24 is a flowchart illustrating an overall process according to the fifth embodiment. Compared to the first embodiment, the fifth embodiment differs in that steps S1001-S1003 are performed. Hereinafter, the different points will be described.

(Example of Obtaining Color Material Types)

In step S1001, the color material type obtaining unit 504 obtains the color material types. The color materials may be, for example, toners. Therefore, the color material type obtaining unit 504 obtains information indicating the toner types such as what color toners are indicated as a setting in the image forming apparatus, for example.

(Example of Obtaining Recording Medium Type)

In step S1002, the recording medium type obtaining unit 502-1 obtains the recording medium type. That is, the recording medium type obtaining unit 502-1 obtains information indicating the recording medium type. For example, the type of the recording medium is obtained from the following GUI or the like.

Figure 25:
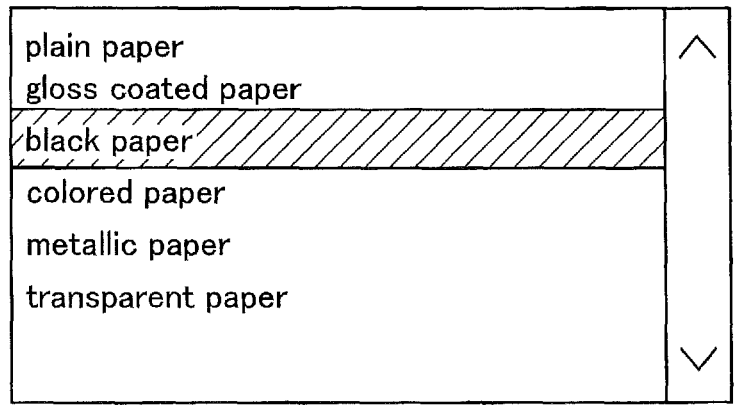
FIG. 25 depicts an example of a GUI for obtaining a recording medium type.

FIG. 25 depicts an example of a GUI for obtaining a recording medium type. As depicted in the GUI, choices such as plain paper, gloss coated paper, black paper, colored paper, metallic paper, and transparent paper are displayed. As depicted in FIG. 25, when black paper is selected by the user, the image processing apparatus 102 identifies the recording medium type as black paper, and the recording medium color as black.

(Example of Designating To-Be-Corrected Colors on the Basis of Color Material Types and Recording Medium Type)

In step S1003, the tone correction unit 506 designates a to-be-corrected color on the basis of the color material types and the recording medium type. For example, the GUI for designating a to-be-corrected color is desirably a display such as the following contents.

Figure 26:
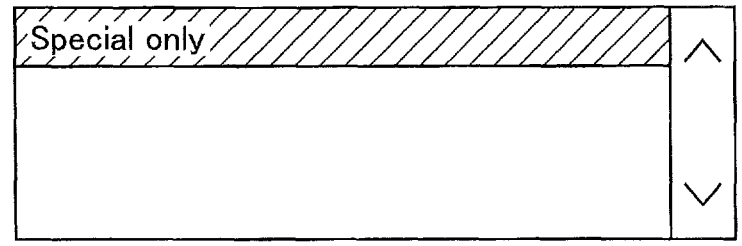
FIG. 26 depicts an example of a designation of a to-be-corrected color according to the fifth embodiment.

FIG. 26 is an example of a designation of a to-be-corrected color according to the fifth embodiment. As depicted in FIG. 26, as a choice of a to-be-corrected color, "Special only", that is, a choice of designating a special color of white as a to-be-corrected color is displayed. That is, the example depicted in FIG. 26 is an example in which "CMYK" and so forth, as depicted in FIGS. 8A and 8B, are not displayed as choices. As described above, it is desirable to select a choice for which the combination of the recording medium color and the toner colors is effective, and not to display the other choices. In such a display, a special color, i.e., white, is selected as a to-be-corrected color, and the CMYK choices are not allowed to be selected as to-be-corrected colors. Thus, it is desirable to provide such a GUI for not allowing such choices that will result in useless correcting processes.

Indication not allowing a selection is not limited to not displaying corresponding choices. For example, it is also possible to provide a GUI where corresponding choices are grayed out, or are controlled not to respond to the user's selecting operations.

Thus, when a recording medium color is black, it is not very effective to use the CMYK colors directly. Accordingly, if, as in the above example, data is provided to use CMYK colors directly for a black recording medium, an error or the like may be output. CMYK may be designated as to-be-corrected colors for a case of forming an image of print condition information, such as page numbers and profile settings, settings to form an image of a stamp indicating "for internal use only", or the like. In such a case, it is desirable that, correction is omitted for the CMYK colors, and, for the colors for which correction is thus omitted, image formation is performed on the basis of the thresholds of the initial state, for example. In this manner, the processing time of the correction can be effectively reduced.

On the other hand, for example, even if a recording medium color is black, the image processing apparatus 102 may apply a white toner, between the recording medium and the printing toner, to form a layer (hereinafter, referred to as a "white layer"). For example, the following GUI is used for implementing the settings.

Figure 27:
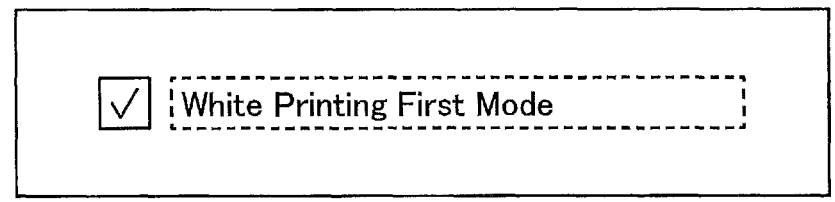
FIG. 27 depicts an example of a GUI for performing a setting to form a white layer.

FIG. 27 is a diagram illustrating an example of a GUI for implementing settings to form a white layer. For example, when a depicted GUI, i.e., a so-called check box, is displayed, the user can make a setting to form a white layer by checking the check box. In response to such a setting to form a white layer being made as depicted in FIG. 27, for example, corresponding tone correction patterns are as follows.

Figure 28:
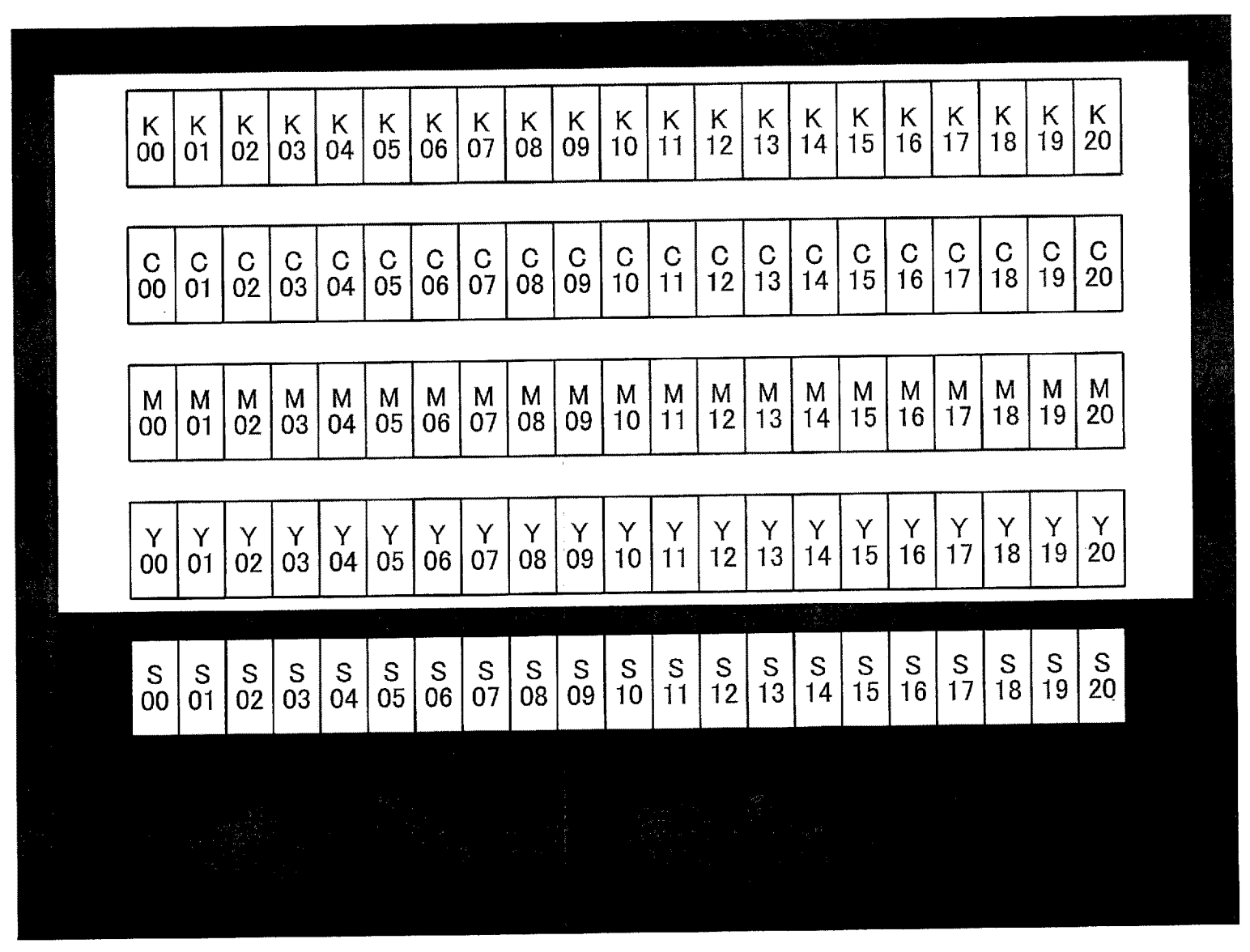

FIG. 28 is a diagram illustrating an example of tone correction patterns for a case of using a white layer. In the depicted example, images of "K", "C", "M", and "Y" are formed on a white layer, i.e., after a white toner is applied. On the other hand, "S", i.e., a white toner, is applied directly to the recording medium. As described above, when a white layer or the like is used, even when the color of the recording medium is black, because the white toner is often mixed with the CMYK toners due to presence of the white layer, brightness tends to be high. Therefore, for example, the following tone characteristics are obtained.

Figure 29:
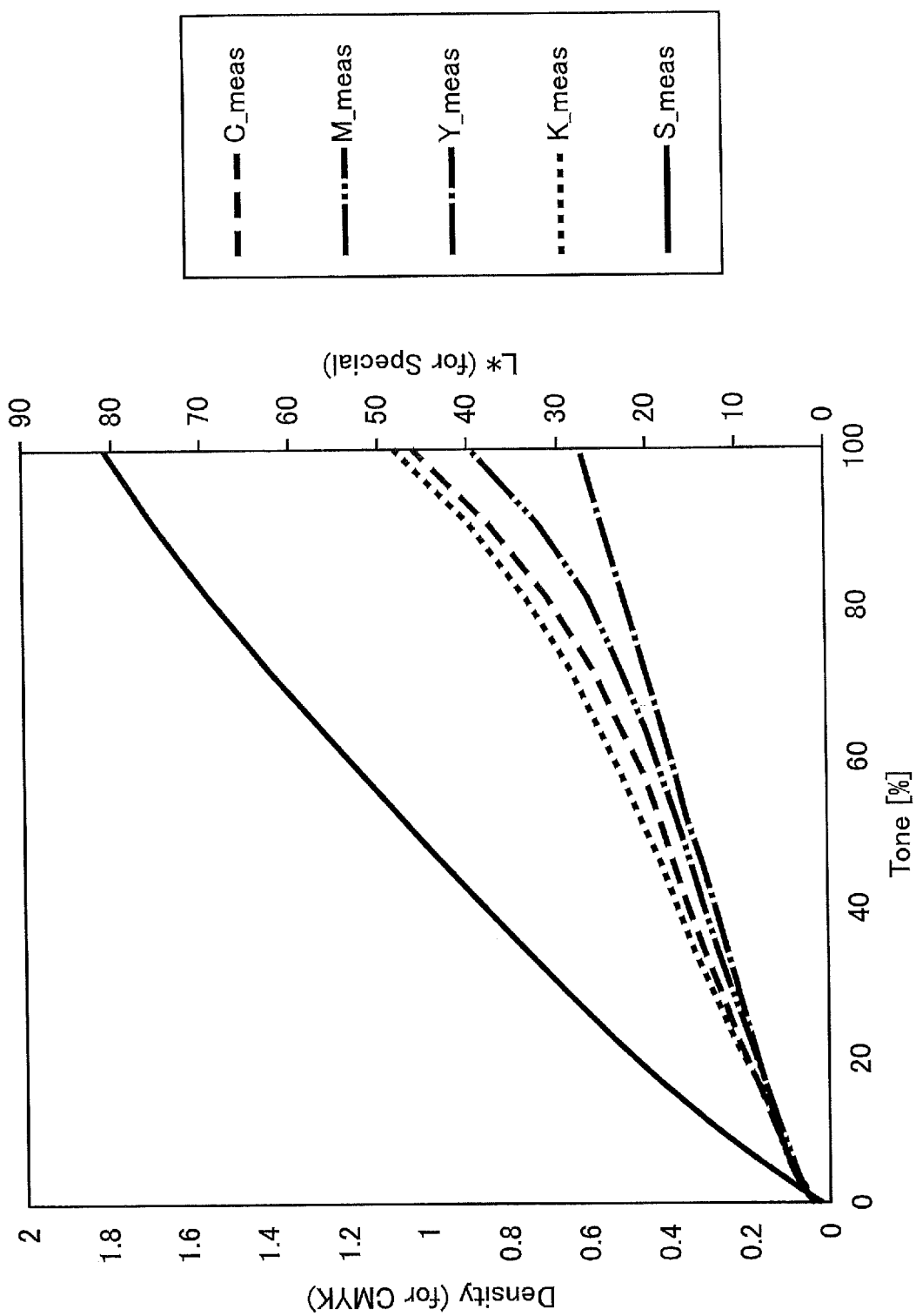
FIG. 29 depicts an example of tone characteristics for a case of using a white layer.

FIG. 29 is a diagram depicting an example of tone characteristics when a white layer is used. Thus, in settings in which a white layer is used as described above, even if the recording medium color is black, colors such as CMYK or the like are also effective.

When a setting as depicted in FIG. 27 is made, that is, when a white layer is used, the GUI depicted in FIG. 26 may be used, and also, the GUI, from which "CMYK+Special" or "CMYK" are selectable, depicted in FIG. 8, may be used, for example.

Sixth Embodiment

A sixth embodiment differs from the other embodiments in that a recording medium color of white and a combination including a special color of white is used. Hereinafter, the different points will be described.

First, when the recording medium color is white and a white color is used as the special color, for example, the following tone characteristics are obtained.

Figure 30:
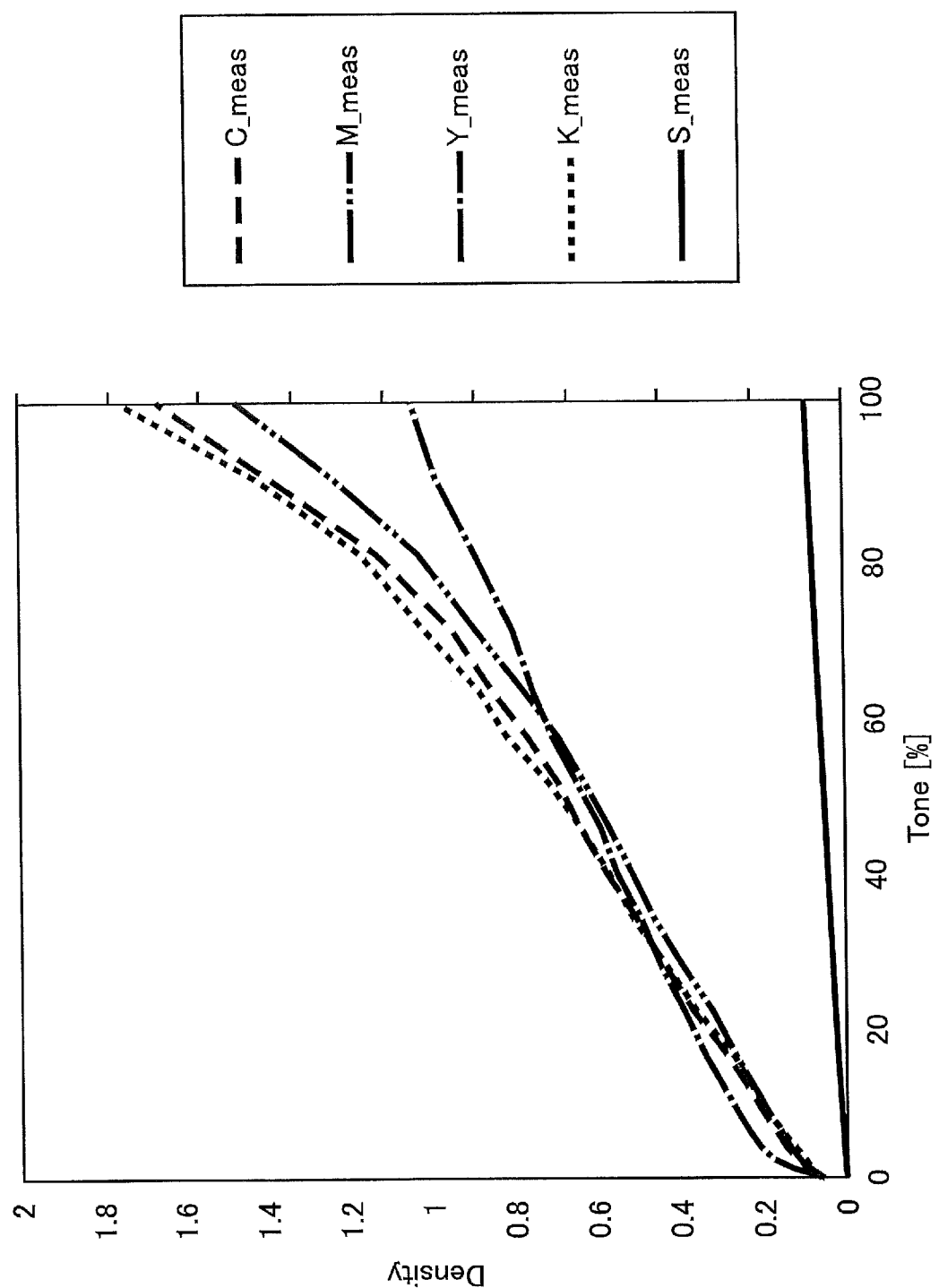
FIG. 30 depicts an example of tone characteristics when a white recording medium is used.

FIG. 30 depicts an example of tone characteristics when a white recording medium is used. As depicted in FIG. 30, when the recording medium color is white, the characteristic value such as density of "S", that is, white, hardly varies. Therefore, it is difficult for white to have tone. Thus, a white toner is not effective when a white recording medium is used.

In addition, when the recording medium color is white, using the color "S" often makes it difficult to identify the boundary between patches. Therefore, it is desirable to carefully identify the position of each patch while performing a measurement.

Figure 31:
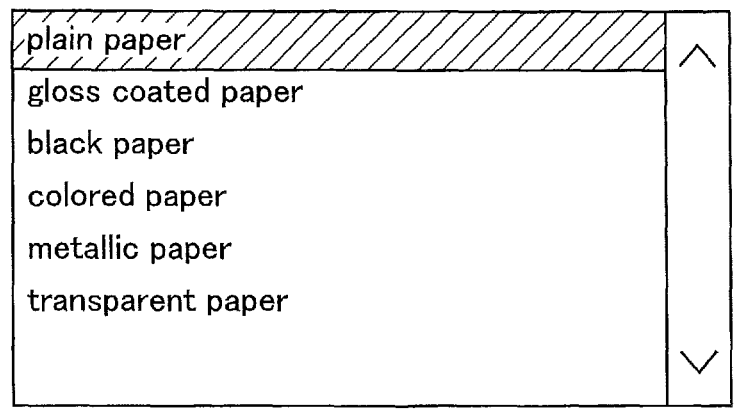
FIG. 31 depicts an example where a recording medium color is identified as white.

FIG. 31 depicts an example in which the recording medium color is determined as being white. For example, a GUI similar to the GUI of FIG. 24 is used. In this example, if, for example, "plain paper" or "gloss coated paper" is selected from the GUI, it is determined that the recording medium color is white. When the recording medium color is thus white, it is desirable that "CMYK" are selectable as to-be-corrected colors and "S" is not selectable as a to-be-corrected color. Thus, also when the recording medium color is white, it is desirable to display a GUI from which a choice for which the combination of the recording medium color and the colors of the toners is effective is selectable, and not to display the other choices in the GUI, for example. As a result of using such a GUI, CMYK can be caused to be selected as to-be-corrected colors and a selection of a white choice can be made impossible. Thus, it is desirable to use such a GUI that makes it impossible to select choices that will result in useless correcting processes.

An indication preventing a choice from being selected is not limited to not displaying the choice. For example, such a GUI in which the choice is grayed out, the choice is controlled not to respond, or the like may be used, instead.

In addition, even for a case of a black recording medium color and using a combination that includes a special color of black, it is desirable that a GUI displays a CMYK choice and prevents the special color from being selected.

Seventh Embodiment

A seventh embodiment differs from the other embodiments in that a recording medium color is white and a combination that includes a special color of a fluorescent color is used. Hereinafter, the different points will be described.

For a case where the recording medium color is white, a fluorescent color has tone, for example, as depicted in FIG. 13. Accordingly, when the recording medium type is white paper or the like, the to-be-corrected color may be "CMYK", "CMYK+Special", or "Special only".

However, there is a case where, for example, fluorescent pink is used in place of "M". Such a case may be a case where, for example, the design is to make the "M" area prominent. Similarly, fluorescent yellow may be used in place of "Y". Such a case may be a case where, for example, the design is to make the "Y" area prominent.

Thus, when a special color of a fluorescent color is used, it is unlikely that the special color will be used alone. Therefore, for designating a to-be-corrected color, that is, in a GUI such as the GUI depicted in FIG. 8A or 8B, it is desirable that the GUI includes two choices of "CMYK" and "CMYK+Special". In such a display, either CMYK or a combination of CMYK and a special color is selected as to-be-corrected colors, and a choice of only a special color is not selectable. Thus, it is desirable to use a GUI that makes it impossible to select such a choice that will result in useless correcting processes.

<Eighth Embodiment>

As color materials for forming images having special colors, further a clear toner, a UV toner, a metal toner, or the like may be used, for example. Such special colors may be such that it is often difficult to measure characteristic values with a sensor such as a densitometer or a colorimeter. Also there are cases where such special colors need not be corrected.

Therefore, in settings using such a special color, upon designating a to-be-corrected color, that is, in a GUI such as the GUI depicted in FIG. 8A or 8B, a GUI including a choice of "CMYK" is desirable. That is, it is desirable to use a GUI that does not allow selecting a special color as a to-be-corrected color. Thus, in settings using a color that need not be corrected, it is desirable to use a GUI from which selection of choices that result in useless correcting processes is not allowed.

In addition, there is a case where correction or the like may be difficult depending on a recording medium type. For example, when a recording medium type is of metallic paper, diffuse reflection from the recording medium is likely to occur. Therefore, it is often difficult to measure characteristic values using a sensor such as a densitometers or a colorimeters. Therefore, in such a case, in order to omit correction, for example, in the GUI depicted in FIG. 8A or 8B, it is desirable that correction is not allowed or all colors are not selectable as to-be-corrected colors.

However, even if a recording medium type is of metallic paper, when a white layer is used, for example, as depicted in FIG. 27, correction may be effectively performed in many cases.

Therefore, for example, as in the fifth embodiment, even when the recording medium type is metallic paper, it is desirable to make settings as depicted in FIG. 27. That is, when a white layer is used, it is possible to use a GUI from which "CMYK" or the like can be selected.

In addition, when, for example, the recording medium type is of transparent paper (for example, when a choice of "transparent paper" is selected in the GUI depicted in FIG. 25), because the recording medium color is transparent, the measurement result such as the characteristic values is likely to vary depending on what is placed under the recording medium. Therefore, for example, when a recording medium having a white color is placed under the recording medium, the same correction and measurement as the correction and measurement in settings in which the recording medium color is white can be effectively performed. Therefore, in such a case, the same designation as in the case where the recording medium color is white or the like is desirable. Therefore, for example, in the GUI depicted in FIG. 8A or 8B, it is desirable that the GUI includes a choice of "CMYK".

Thus, it is desirable to use a GUI that makes it impossible to select a choice of a to-be-corrected color that will result in useless correcting processes or use a GUI that includes a choice of a to-be-corrected color that will result in effective correcting processes.

Ninth Embodiment

A ninth embodiment is different from the other embodiments in that replacement of a special color is different. Hereinafter, the different points will be described. First, assume that a special color of fluorescent pink is used. Therefore, for a combination of CMYK and fluorescent pink, correction such as the correction according to, for example, the first embodiment is performed. After the correction, an image is formed with the use of CMYK and a special color of fluorescent pink. Further subsequently, the combination of colors is maintained for a case where an image will be formed with the use of only CMYK, with the use of only fluorescent pink, or with the use of both CMYK and fluorescent pink.

On the other hand, when the next image formation is image formation using fluorescent yellow, the special color is replaced. Such a replacement results in a particular combination of CMYK and fluorescent yellow. Such a replacement is detected by the color material type obtaining unit 504. After such a replacement, correction of CMYK has been already finished before the replacement, so correction of CMYK is not necessary. On the other hand, for fluorescent yellow, correction has not been performed yet, and, for fluorescent pink, correction has been already performed. Therefore, it is desirable that correction for a special color is reset to the initial state.

In this regard, the result obtained by correction for fluorescent pink may be stored without being deleted. For example, after image forming using fluorescent yellow is completed, fluorescent pink may be used again as a special color. When a special color is thus returned to fluorescent pink, it may be often desirable to use the correction result of fluorescent pink that has been stored in the storage unit 509 rather than resetting the correction result of fluorescent pink.

As described above, such settings are to be provided that, when a special color replacement is detected, the image processing apparatus 102 maintains the correction result of CMYK on the basis of the detection result, and resets the correction result of the special color or use a correction result stored in the storage unit 509. In addition, in such a case, CMYK is more likely to have been properly corrected, so it is desirable that CMYK's correction be maintained.

Thus, by resetting a correction of a special color or using a previous correction result stored in the storage unit 509 on the basis of a detection result, defective image formation can be prevented and useless correcting processes can be reduced.

Summary of Embodiments

Actually, it is desirable that processing such as designation, displaying, and correction of to-be-corrected colors be performed, for example, as follows (see Table 2 below).

TABLE 2

| | | | | | correction result | | |
| --- | --- | --- | --- | --- | --- | --- | --- |
| No. | apparatus state | special color | recording medium type | GUI displayed choices | to-be-corrected color | CMYK | special color |
| 1 | initial state | fluorescent pink | — | | | initial state | initial state |
| 2 | calibration executed 1 | fluorescent pink | plain paper | CMYK CMYK + Special | CMYK | corrected state P_A | initial state |
| 3 | calibration executed 2 | fluorescent pink | plain paper | CMYK CMYK + Special | CMYK + Special | corrected state P_B | corrected state S_A |
| 4 | special toner replaced | fluorescent yellow | — | | | corrected state P_B | initial state |
| 5 | calibration executed 3 | fluorescent yellow | gloss coated paper | CMYK CMYK + Special | CMYK + Special | corrected state P_C | corrected state S_B |

TABLE 2-continued

| No. | apparatus state | special color | recording medium type | GUI displayed choices | to-be-corrected color | correction result CMYK | special color |
|---|---|---|---|---|---|---|---|
| 6 | calibration executed 4 | fluorescent yellow | gloss coated paper | CMYK CMYK + Special | CMYK | corrected state P_D | corrected state S_B |
| 7 | special toner replaced | clear | — | | | corrected state P_D | initial state |
| 8 | calibration executed 5 | clear | plain paper | CMYK | CMYK | corrected state P_E | initial state |
| 9 | special toner replaced | white | — | | | corrected state P_E | initial state |
| 10 | calibration executed 6 | white | black paper | Special only | Special only | initial state | corrected state S_C |
| 11 | calibration executed 7 | white | plain paper | CMYK | CMYK | corrected state P_F | initial state |
| 12 | special toner replaced | fluorescent yellow | — | | | corrected state P_F | corrected state S_B |
| 13 | calibration executed 8 | fluorescent yellow | gloss coated paper | CMYK CMYK + Special | CMYK + Special | corrected state P_G | corrected state S_D |

The "No. 1" state in Table 2 above is an "initial state". A "special color" is a "fluorescent pink". Because correction has not been made yet in this state, a correction result is "initial state" for both "process color" and "special color".

Next, as "plain paper" is selected as a "recording medium type" as depicted in "No. 2", "GUI displayed choices" is "CMYK" and "CMYK+Special". The example is when "CMYK" is designated as a "to-be-corrected color" by the user from the GUI. With such a designation, correction is performed on CMYK. Therefore, a "correction result" of "process color" is the correction result of "No. 2", and actually, is a "corrected state P_A". On the other hand, the "special color" is not designated as a "to-be-corrected color", so the "No. 1" state is maintained and is the "initial state" as depicted.

On the other hand, as "CMYK+Special" are designated as a "to-be-corrected color" depicted in "No. 3", correction is performed on both CMYK and special color. Therefore, the "correction result" of "process color" is a "corrected state P_B" and thus, the correction result of the correction made in "No. 2" is updated. On the other hand, for the "special color", the correction result is also updated as being a "corrected state S_A".

Then, after "No. 3", the special color "fluorescent pink" is replaced with "fluorescent yellow", as depicted in "No. 4". As such a replacement is detected, correction for the special color is reset and the correction result is set as the "initial state". On the other hand, for the "process color", the correction result is maintained and is the "corrected state P_B.

After "No. 4", for example, as depicted in "No. 5", a "recording medium type" is made to be "gloss coated paper". Then, "CMYK+Special" are set as a "to-be-corrected color". Thus, correction is performed on both CMYK and the special color. Therefore, the "correction result" of the "process color" is updated to a "corrected state P_C". Similarly, the "correction result" of the "special color" is updated to a "corrected state S_B".

When, for example, "CMYK" are designated as a "to-be-corrected color" after "No. 5", the "correction result" of the "process color" is updated to a "corrected state P_D" as depicted in "No. 6". On the other hand, the "correction result" of the "special color" is not changed because no special color is designated as a to-be-corrected color, and thus, the correction result is maintained.

Next, after "No. 6", the special color is changed from "fluorescent yellow" to "clear", as depicted in "No. 7". As such a replacement is detected, correction for the special color is reset and a correction result is set to an "initial state". On the other hand, for the "process color", the correction result is maintained and thus, is the "corrected state P_D".

After "No. 7", as depicted in "No. 8", "plain paper" is selected as a "recording medium type". The special color "clear" is an example of a color that does not require correction. Therefore, the GUI in which "CMYK" is a choice is desirable for a "to-be-corrected color". As "CMYK" are corrected, the "correction result" of the "process color" is updated to "corrected state P_E". On the other hand, the "correction result" of the "special color" is maintained in the "initial state".

Next, after "No. 8", the special color is switched from "clear" to "white" as depicted in "No. 9". As such a replacement is detected, the correction for the special color is reset and the correction result is set to the "initial state". On the other hand, the correction result of the "process color" is maintained and is the "corrected state P_E".

After "No. 9", a "recording medium type" is set as "black paper" as depicted in "No. 10". As a result, it is determined that the recording medium color is black and the special color is white. Therefore, the GUI is displayed allowing selection of the "Special only" and not allowing selection of the other choices for the "to-be-corrected color". Because correction is performed for the special color, the "correction result" of the "special color" is a "corrected state S_C". On the other hand, the "correction result" of the "process color" is, for example, an "initial state".

Next, as depicted in "No. 11", "plain paper" is designated as a "recording medium type". That is, the recording medium color is white and the special color is "white". In such a case, the GUI in which "CMYK" is a choice is desirable for a "to-be-corrected color". As "CMYK" are corrected, the "correction result" of the "process color" is updated to a "corrected state P_F". On the other hand, the "correction result" of the "special color" is reset to an "initial state".

Subsequently, after "No. 11", the special color is switched from "white" to "fluorescent yellow", as depicted in "No.

12". As such a replacement is detected, the correction result for the special color is the "corrected state S_B" which is the correction result stored with respect to "No. 5". On the other hand, the "correction result" of the "process color" is maintained as the "corrected state P_F".

In the example of "No. 12", the correction result "corrected state S_B" stored in the storage unit is used as mentioned above. However, in a case where the correction result is a correction result obtained long time ago, for example, a half day or more have elapsed, correction may be performed again.

Next, after "No. 12", the "recording medium type" is changed to "gloss coated paper" as depicted in "No. 13". In such a case, the "GUI displayed choices" are to be two choices, i.e., "CMYK" and "CMYK+Special". As the choice "CMYK+Special" is selected, both CMYK and the special color are corrected. Therefore, the "correction result" of the "process color" is updated to a "corrected state P_G". Also, the "correction result" of the "special color" is updated to a "corrected state S_D".

Thus, as a result of to-be-corrected colors being designated on the basis of a combination of a recording medium and a special color, useless correcting processes can be reduced and the processing time of the correction can be reduced.

Other Embodiments

Although the image processing apparatuses, the image processing systems, and the non-transitory recording media have been described with reference to the embodiments, embodiments of the present invention are not limited to the above-described embodiments. Various modifications can be made within the scope of the present invention.

For example, each apparatus or device need not be a single apparatus or device. That is, each apparatus or device may be a combination of apparatuses or devices. In addition, an apparatus or device other than the apparatuses and the devices depicted in the drawing may be further included.

The information processing apparatuses may be any apparatuses having communication functions, for example, notebook personal computers (PCs), cellular phones, smartphones, tablet terminals, wearable PCs, or desktop PCs.

The image processing systems may also utilize AI (Artificial Intelligence) or the like.

All or some of the processes according to the embodiments may be described in a low-level language or a high-level language and implemented by programs for having computers perform the image processing methods. That is, the programs are computer programs for having computers such as the image processing apparatuses or the image processing systems execute the various processes.

Accordingly, when the image processing methods are executed on the basis of the programs, the arithmetic and logic devices and the control devices of the computers perform arithmetic and logic operations and controlling operations on the basis of the programs for executing the various processes. The storage devices of the computers store the data used for the processes on the basis of the programs in order to execute the various processes.

The programs can be recorded on computer-readable recording media and distributed. The recording media may be media such as magnetic tapes, flash memories, optical disks, optical magnetic disks, or magnetic disks. In addition, the programs may be distributed through electric telecommunication lines.

The embodiments according to the present invention may be implemented by image processing system including a plurality of information processing apparatuses. The image processing system may implement the various processes and storing data in redundant, distributed, parallel, or virtualized manner, or a manner where any ones of these manners are combined.

The present application is based on and claims priority to Japanese patent application No. 2019-129581, filed on Jul. 11, 2019 and Japanese patent application No. 2020-098900, filed on Jun. 5, 2020. The entire contents of Japanese patent application No. 2019-129581 and Japanese patent application No. 2020-098900 are hereby incorporated herein by reference.

What is claimed is:

1. An image processing apparatus comprising:
circuitry configured to
receive a designation of a to-be-corrected color that is a process color or a special color different from the process color and is to be corrected;
identify, on the basis of the designation, a tone correction pattern, and generate rendering data of the tone correction pattern to be used for forming an image on a recording medium;
obtain a standard value of the to-be-corrected color; and
correct the to-be-corrected color on the basis of a difference between a color measuring result obtained from measuring a color of the image of the tone correction pattern formed on the recording medium and the standard value,
wherein the image processing apparatus further comprises:
a display unit, wherein
the circuitry is further configured to cause the display unit to display, as choices of combinations for the to-be-corrected color, to select "CMYK" or "CMYK+Special color", and not to select a choice of only the special color, when a special color of a fluorescent color is used.

2. The image processing apparatus according to claim 1, further comprising:
a display unit, wherein
the circuitry is further configured to cause the display unit to display, as a choice or choices for the to-be-corrected color, the process color, the special color, or a combination of the process color and the special color.

3. The image processing apparatus according to claim 2, wherein
the special color includes white.

4. An image processing system comprising:
receiving circuitry configured to receive a designation of a to-be-corrected color that is a process color or a special color different from the process color and is to be corrected;
rendering data generating circuitry configured to identify, on the basis of the designation, a tone correction pattern, and generate rendering data of the tone correction pattern;
tone characteristic obtaining circuitry configured to obtain a standard value of the to-be-corrected color,
image forming circuitry configured to form an image of the tone correction pattern on a recording medium; and
tone correction circuitry configured to correct the to-be-corrected color on the basis of a difference between a color measuring result obtained from measuring a color of the image of the tone correction pattern formed on the recording medium and the standard value wherein the image processing system further comprises:
a display unit, and
displaying circuitry configured to cause the display unit to display, as choices of combinations for the to-be-corrected color, to select "CMYK" or "CMYK+Special color", and not to select a choice of only the special color, when a special color of a fluorescent color is used.

5. A non-transitory recording medium storing a program, when executed by a processor of an image processing apparatus, causing the processor to implement an image processing method, the image processing method comprising:

receiving a designation of a to-be-corrected color that is a process color or a special color different from the process color and is to be corrected;

identifying, on the basis of the designation, a tone correction pattern, and generating rendering data of the tone correction pattern to be used for forming an image on a recording medium;

obtaining a standard value of the to-be-corrected color; and correcting the to-be-corrected color on the basis of a difference between a color measuring result obtained from measuring a color of the image of the tone correction pattern formed on the recording medium and the standard value, wherein the method further comprises:

causing a display unit to display, as choices of combinations for the to-be-corrected color, to select "CMYK" or "CMYK+Special color", and not to select a choice of only the special color, when a special color of a fluorescent color is used.

6. The image processing apparatus according to claim 1, wherein the circuitry is configured to cause the display unit to display to select "CMYK", "CMYK+Special color" or "Special color only" when the special color excluding the fluorescent color is used.

* * * * *